US010359012B2

(12) United States Patent
Kikuchi

(10) Patent No.: US 10,359,012 B2
(45) Date of Patent: Jul. 23, 2019

(54) INTERNAL COMBUSTION ENGINE

(71) Applicant: Toyota Jidosha Kabushiki Kaisha, Toyota-shi, Aichi-ken (JP)

(72) Inventor: Kazuki Kikuchi, Mishima (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 85 days.

(21) Appl. No.: 15/591,865

(22) Filed: May 10, 2017

(65) Prior Publication Data

US 2017/0342949 A1     Nov. 30, 2017

(30) Foreign Application Priority Data

May 30, 2016 (JP) ................. 2016-107290

(51) Int. Cl.
| | | |
|---|---|---|
| *F02M 35/08* | (2006.01) | |
| *F02M 26/22* | (2016.01) | |
| *F02M 26/50* | (2016.01) | |
| *F02M 25/03* | (2006.01) | |
| *F02B 47/02* | (2006.01) | |
| *F02B 29/04* | (2006.01) | |
| *F02M 26/04* | (2016.01) | |
| *F02B 37/00* | (2006.01) | |

(52) U.S. Cl.
CPC ....... *F02M 35/088* (2013.01); *F02B 29/0481* (2013.01); *F02B 37/00* (2013.01); *F02B 47/02* (2013.01); *F02M 25/03* (2013.01); *F02M 26/04* (2016.02); *F02M 26/22* (2016.02); *F02M 26/50* (2016.02)

(58) Field of Classification Search
CPC ...... F02B 29/0481; F02B 37/00; F02B 47/02; F02B 33/44; F02M 25/03; F02M 26/04; F02M 26/22; F02M 26/50; F02M 35/088
USPC .......................................................... 60/599
See application file for complete search history.

(56) References Cited

U.S. PATENT DOCUMENTS

| | | | | |
|---|---|---|---|---|
| 4,725,359 A | * | 2/1988 | Ray ...................... | B01D 53/268 210/640 |
| 2010/0205949 A1 | * | 8/2010 | Bolda ................... | B01D 46/12 60/309 |

FOREIGN PATENT DOCUMENTS

JP          2011-111897 A       6/2011

* cited by examiner

*Primary Examiner* — Patrick D Maines
*Assistant Examiner* — Edward Bushard
(74) *Attorney, Agent, or Firm* — Dinsmore & Shohl LLP

(57) ABSTRACT

An internal combustion engine includes, in addition to an LPL-EGR system, two water vapor separation film modules for fresh air and for EGR gas. One module 34 is connected to a pressure reducing pump 40 through a suction passage 38. Other module 36 is connected to a pressure reducing pump 44 through a suction passage 42. A condenser 54 that condenses water vapor that flows through the suction passage 38 is provided in the suction passage 38. A water tank 56 that temporarily accumulates condensed water that is discharged from the condenser 54 is provided on a downstream side relative to the condenser 54. The water tank 56 is connected to injectors 60 that inject water from the water tank 56 into intake ports of respective cylinders or into respective cylinders.

5 Claims, 15 Drawing Sheets

INTERNAL COMBUSTION ENGINE

CROSS-REFERENCE TO RELATED APPLICATION

The present application claims priority under 35 U.S.C. § 119 to Japanese Patent Application No. 2016-107290, filed on May 30, 2016. The contents of this application are incorporated herein by reference in their entirety.

BACKGROUND

Technical Field

This disclosure relates to an internal combustion engine, and more particularly relates to an internal combustion engine that is equipped with an EGR system that causes exhaust gas that flows through an exhaust passage to recirculate to an intake passage.

Background Art

There is a known internal combustion engines with an EGR system that introduces exhaust gas from an exhaust passage into an intake passage through an EGR passage. With regard to an internal combustion engine equipped with such EGR system, for example, JP 2011-111897 A discloses an internal combustion engine that includes an EGR cooler that is provided in an EGR passage, a water tank that recovers condensed water of the EGR cooler, and an adding apparatus that adds condensed water from inside the water tank into an intake duct. The condensed water of the EGR cooler arises as a result of water vapor contained in exhaust gas (EGR gas) that flows through the EGR passage being cooled in the EGR cooler. By recovering the condensed water of the EGR cooler into the water tank and adding the condensed water into the intake duct, intake air inside the intake duct can be cooled by latent heat of vaporization of the condensed water.

However, since acidic components originating from SOx or NOx are contained in EGR gas, in the internal combustion engine disclosed in the aforementioned official gazette, condensed water of the EGR cooler will acidify if acidic components of EGR gas are incorporated into condensed water of the EGR cooler. Acidified condensed water of the EGR cooler becomes a factor that corrodes a conduit from the EGR cooler to the water tank, a conduit from the water tank to the adding apparatus, or a conduit inside the adding apparatus. Consequently, it is not desirable to actively generate condensed water in an EGR cooler, even though the condensed water is water for cooling intake air inside an intake duct. Therefore, there is a desire to develop novel technology that can secure water for cooling intake air inside an intake duct while suppressing the generation of condensed water in an EGR cooler.

The present disclosure has been made in consideration of the above described problem, and an object of the present disclosure is to provide novel technology that can secure water for cooling intake air in an internal combustion engine while suppressing the generation of condensed water accompanying cooling of EGR gas at an EGR cooler.

SUMMARY

An internal combustion engine according to the present disclosure includes a gas passage, a cooling portion, a water vapor separating portion, a pressure reducing portion, a water vapor condensing portion and a water injecting portion. The cooling portion is provided in the gas passage and cools gas that flows into the cylinder. The water vapor separating portion constitutes one part of the gas passage on an upstream side in a gas flow direction relative to the cooling portion, and includes a water vapor permeable film which, when installed so as to separate two spaces which have different partial water vapor pressures, allows water vapor to permeate from a space in which a partial water vapor pressure is higher toward a space in which a partial water vapor pressure is lower. The pressure reducing portion reduces a partial water vapor pressure of an outer space so that a difference in partial water vapor pressures arises between an inner space of the water vapor permeable film in which gas that flows into the water vapor separating portion from the gas passage flows and the outer space which is separated from the inner space by the water vapor permeable film. The water vapor condensing portion is connected to the pressure reducing portion and condenses water vapor that moves from the inner space to the outer space. The water injecting portion is connected to the water vapor condensing portion, and injects condensed water that arises at the water vapor condensing portion into the cylinder or an intake port.

By reducing the partial water vapor pressure of the outer space so that a difference arises in the partial water vapor pressures between the inner space of the water vapor permeable film and the outer space which is separated from the inner space by the water vapor permeable film, water vapor included in gas that flows into a cylinder moves from the inner space to the outer space. That is, before cooling at the cooling portion, water vapor is removed from gas that flows into a cylinder. Further, when the water vapor that moves to the outer space from the inner space is condensed, condensed water is generated. By injecting the generated condensed water into the cylinder or an intake port, gas inside the cylinder or inside the intake port is cooled by latent heat of vaporization of the condensed water.

The internal combustion engine according to the present disclosure may further include a pressure reduction amount adjustment portion. The pressure reduction amount adjustment portion adjusts a pressure reduction amount of the partial water vapor pressure in the outer space that is reduced by the pressure reducing portion, so that a partial water vapor pressure on a downstream side in the gas flow direction relative to the cooling portion in the gas passage is less than a saturated water vapor pressure.

By adjusting a pressure reduction amount of the partial water vapor pressure in the outer space that is reduced by the pressure reducing portion so that the partial water vapor pressure on the downstream side in the gas flow direction relative to the cooling portion in the gas passage is less than the saturated water vapor pressure, generation of condensed water accompanying cooling of gas at the cooling portion is suppressed.

The internal combustion engine according to the present disclosure may further include a condensed water reservoir portion. The condensed water reservoir portion is provided between the water vapor condensing portion and the water injecting portion, and accumulates condensed water that arises at the water vapor condensing portion. In this case, the pressure reduction amount adjustment portion may calculate a target value of the pressure reduction amount based on a target value of a water vapor amount that is moved from the inner space to the outer space, and, by way of exception, when a target value of a water amount that is injected into the cylinder or the intake port by the water injecting portion is greater than a target value of the water vapor amount, may calculate the target value of the pressure reduction amount based on the target value of the water amount.

If a target value of the pressure reduction amount is calculated based on a target value of a water vapor amount that is moved from the inner space to the outer space, generation of condensed water that accompanies cooling of gas at the cooling portion is suppressed. Further, by way of exception, when a target value of a water amount that is injected into the cylinder or the intake port by the water injecting portion is greater than a target value of the water vapor amount, the target value of the pressure reduction amount is calculated, based on a target value of the water amount, a situation in which the condensed water amount inside the condensed water reservoir portion continues to decrease as a result of water injection by the water injecting portion is avoided.

In the internal combustion engine according to the present disclosure, the gas passage may be an EGR passage which connects an intake passage and an exhaust passage. In this case, the cooling portion is an EGR cooler that cools EGR gas which flows through the EGR passage, and the water vapor separating portion constitutes one part of the EGR passage on an upstream side in a gas flow direction relative to the EGR cooler of the EGR passage.

In the internal combustion engine according to the present disclosure, the gas passage may be an intake passage in which a compressor of a turbocharger is provided. In this case, the cooling portion is an intercooler that cools gas that is compressed at the compressor, and the water vapor separating portion constitutes one part of the intake passage on an upstream side in a gas flow direction relative to the compressor of the intake passage.

According to the internal combustion engine of the present disclosure, water for cooling gas that flows into a cylinder can be secured while suppressing the generation of condensed water accompanying cooling of gas at a cooling portion such as an EGR cooler or an intercooler.

DESCRIPTION OF EMBODIMENTS

Figure 1:
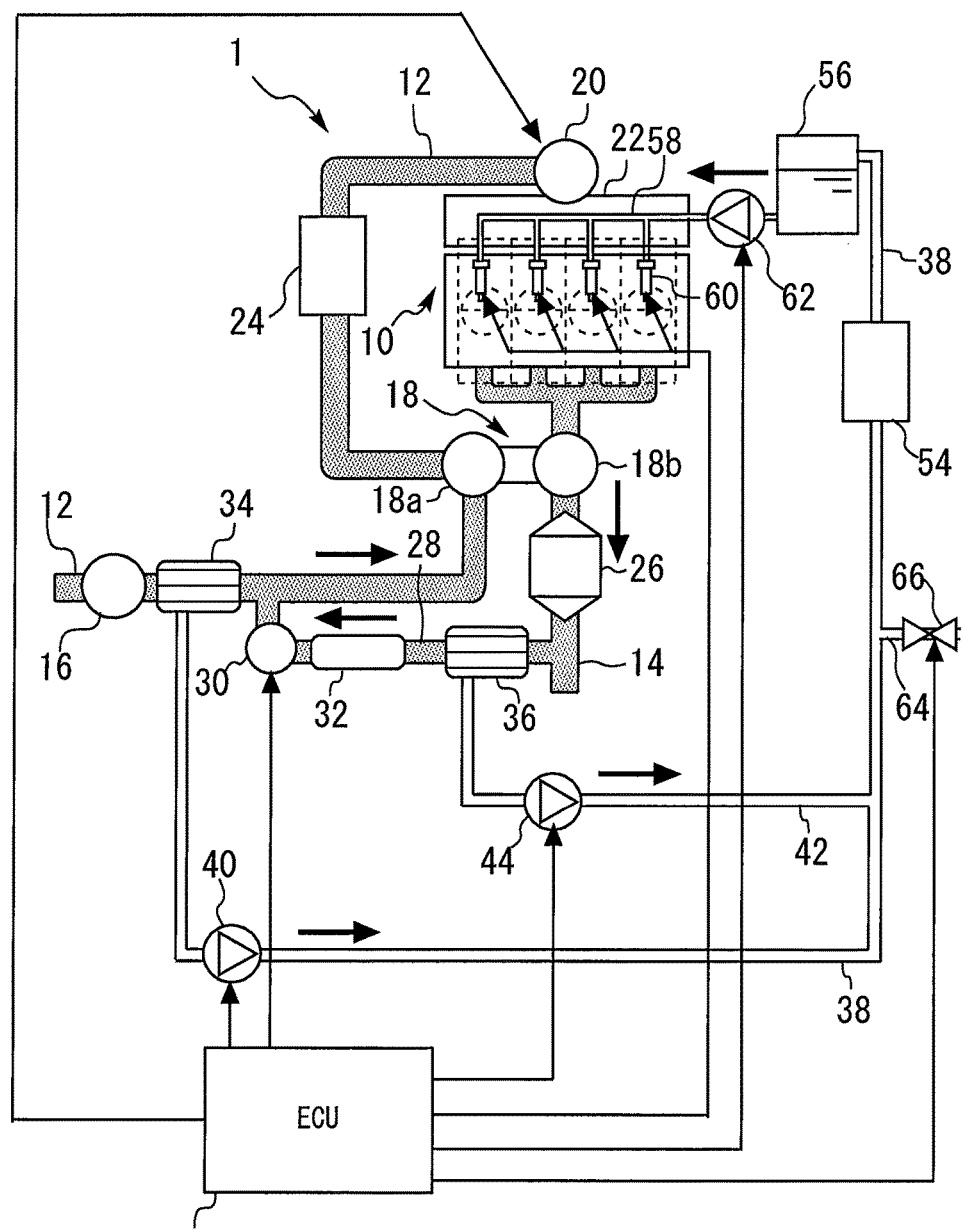
FIG. 1 is a schematic diagram illustrating the overall configuration of an internal combustion engine according to a first embodiment of the present disclosure.

Embodiments of the present disclosure are described hereunder based on the accompanying drawings. Note that elements that are common to the respective drawings are denoted by the same reference characters and a duplicate description thereof is omitted. Further, the present disclosure is not intended to be limited by the embodiments described hereunder.

First Embodiment

A first embodiment of the present disclosure will be described referring to FIGS. 1 to 10.

[Description of Configuration of Internal Combustion Engine According to First Embodiment]

FIG. 1 is a schematic diagram illustrating the overall configuration of an internal combustion engine according to the first embodiment of the present disclosure. An internal combustion engine 1 illustrated in FIG. 1 includes an inline four-cylinder engine body 10 as a vehicle power source. However, the number of cylinders and the arrangement of the cylinders of the engine body 10 are not limited thereto. An intake passage 12 and an exhaust passage 14 are connected to each cylinder of the engine body 10. An air cleaner 16 is mounted in the vicinity of an inlet of the intake passage 12. A compressor 18*a* of a turbocharger 18 is installed downstream of the air cleaner 16. The compressor 18*a* is driven by rotation of a turbine 18*b* that is disposed in the exhaust passage 14. An electronically controlled throttle valve 20 is provided in the intake passage 12 at a position that is on a downstream side relative to the compressor 18*a*. A surge tank 22 that is connected to intake ports (omitted from the drawings) of the respective cylinders is provided in the intake passage 12 at a position that is on a downstream side relative to the throttle valve 20. An intercooler 24 that cools gas that flows through the intake passage 12 is provided in the intake passage 12 at a position that is between the compressor 18*a* and the throttle valve 20.

A catalyst (as one example, a three-way catalyst) 26 that purifies exhaust gas from each cylinder of the engine body 10 is arranged at a position on a downstream side relative to the turbine 18*b* in the exhaust passage 14. One end of an EGR passage 28 is connected to the exhaust passage 14 on a downstream side relative to the catalyst 26. The other end of the EGR passage 28 is connected to the intake passage 12 on an upstream side relative to the compressor 18a. An EGR valve 30 is provided partway along the EGR passage 28. Opening the EGR valve 30 allows one part of exhaust gas that flows through the exhaust passage 14 to flow into the intake passage 12 as EGR gas. An EGR cooler 32 that cools EGR gas that flows through the EGR passage 28 is provided in the EGR passage 28 on an upstream side relative to the EGR valve 30 (upstream side in the flow direction of the EGR gas).

The turbocharger 18, the intercooler 24, the EGR passage 28, the EGR valve 30 and the EGR cooler 32 constitute an EGR system (a so-called "LPL-EGR system") that causes a part of exhaust gas that flows in the exhaust passage 14 on the downstream side relative to the turbine 18b to recirculate through the EGR passage 28 to the intake passage 12 on the upstream side relative to the compressor 18a. In addition to such an LPL-EGR system, the internal combustion engine 1 illustrated in FIG. 1 is also equipped with two water vapor separation film modules which are for fresh air and for EGR gas. A module 34 for fresh air is provided in the intake passage 12 between a connecting portion with the EGR passage 28 and the air cleaner 16. On the other hand, a module 36 for EGR gas is provided in the EGR passage 28 on the upstream side relative to the EGR cooler 32. The module 34 and the module 36 share the same basic configuration. The module 34 is connected to a pressure reducing pump 40 through a suction passage 38. The module 36 is connected to a pressure reducing pump 44 through a suction passage 42.

[Description of Configuration of Water Vapor Separation Film Module]

Figure 2:
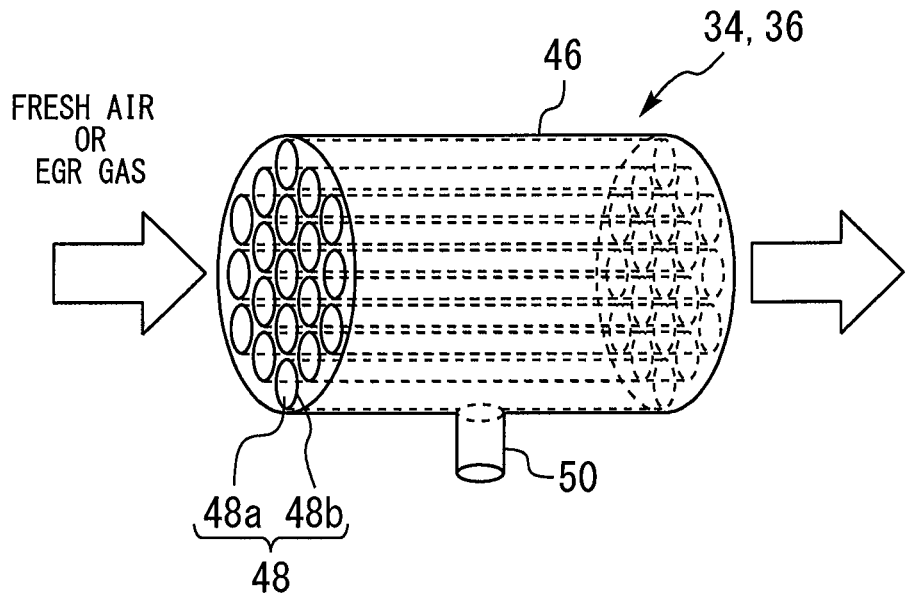
FIG. 2 is a schematic diagram illustrating the configuration of modules 34 and 36.

FIG. 2 is a schematic diagram illustrating the configuration of the modules 34 and 36. As shown in FIG. 2, the modules 34 and 36 include a circular tubular housing 46, and a large number of tubular films 48 that are filled inside the housing 46. The housing 46 is constituted by, for example, a resin, and a discharge port 50 that is connected to one end of the suction passages 38 and 42 shown in FIG. 1 is formed in a side face thereof. The side face of the housing 46 of the module 34 is contiguous with an outer wall surface of the intake passage 12, and the side face of the housing 46 of the module 36 is contiguous with an outer wall surface of the EGR passage 28. That is, the side face of the housing 46 of the module 34 constitutes one part of the outer wall surface of the intake passage 12, and the side face of the housing 46 of the module 36 constitutes one part of the outer wall surface of the EGR passage 28. The tubular films 48 are hollow fiber films made from, for example, hydrophilic macromolecules or zeolite, and include an inner wall surface 48a and an outer wall surface 48b. The respective tubular films 48 are gathered together densely and in parallel with each other along the opening direction (direction of arrows shown in FIG. 2) of the housing 46, and are integrally fixed to the housing 46.

Figure 3:
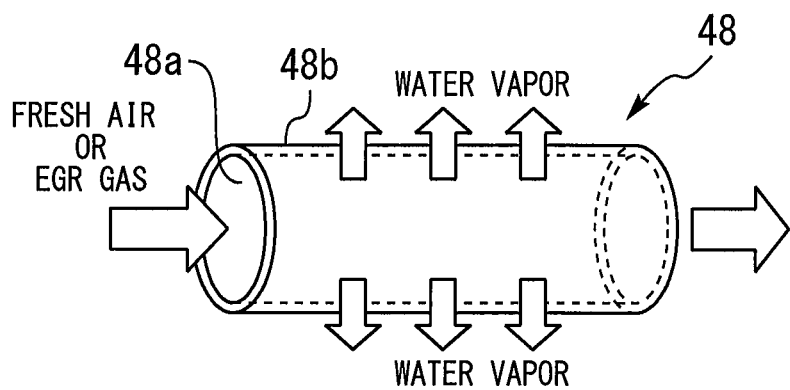
FIG. 3 is a view for describing a flow of gas that flows into the modules 34 and 36.

Fresh air that flows into the module 34 from one end of the housing 46, or EGR gas that flows into the module 36 from one end of the housing 46 is discharged from the other end of the housing 46. FIG. 3 is a view for describing the flow of gas that flows into the modules 34 and 36, in which one among the large number of tubular films 48 shown in FIG. 2 is illustrated. As indicated by thick arrows in FIG. 3, gas that flows into the tubular film 48 flows through the inner side of the inner wall surface 48a and proceeds in the downstream direction. Further, as indicated by thin arrows in the film thickness direction, part of water vapor that is included in the gas that flows through the inside of the inner wall surface 48a moves through the interior of the tubular film 48 from the inner wall surface 48a toward the outer wall surface 48b.

Figure 4:
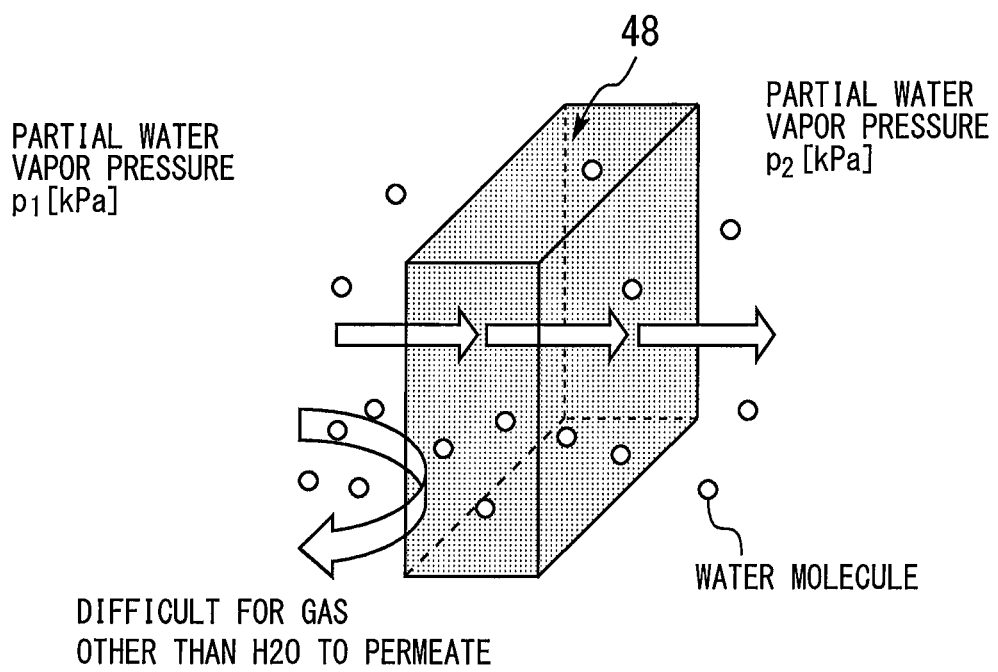
FIG. 4 is a view for describing a permeation principle with respect to water vapor at a tubular film 48.

The reason that part of the water vapor moves in the film thickness direction of the tubular film 48 is that a difference arises between partial water vapor pressures in two spaces into which the tubular film 48 is separated. FIG. 4 is a view for describing a permeation principle with respect to water vapor in the tubular film 48. One part of the tubular film 48 illustrated in FIG. 3 is schematically shown in FIG. 4. When a partial water vapor pressure $p_1$ of a left space of the tubular film 48 illustrated in FIG. 4 is higher than a partial water vapor pressure $p_2$ of a right space, a concentration gradient arises inside the film as a result of water vapor dissolving on the surface of the tubular film 48 that forms an interface with the left space, and this concentration gradient serves as a driving force under which water vapor (more exactly, water molecules) moves from the left space side to the right space side. Movement of the water vapor continues until a partial water vapor pressure difference $\Delta p$ ($=p_1-p_2$) between the two spaces disappears. Note that the tubular film 48 is provided with a configuration such that it is difficult for a gas other than water vapor to move inward, and therefore basically only water vapor moves between the two spaces into which the tubular film 48 is separated.

The description of the configuration of the internal combustion engine according to the present embodiment will now be continued with reference again to FIG. 1. The suction passage 42 on a downstream side (downstream side in the flow direction of water vapor) relative to the pressure reducing pump 44 merges with the suction passage 38 on a downstream side (downstream side in the flow direction of water vapor) relative to the pressure reducing pump 40. A condenser 54 that condenses water vapor flowing through the suction passage 38 is provided in the suction passage 38 on a downstream side relative to a merging portion with the suction passage 42. A water tank 56 that temporarily accumulates condensed water discharged from the condenser 54 is provided in the suction passage 38 on a downstream side relative to the condenser 54. The water tank 56 is connected through a supply passage 58 to injectors 60 that inject water from the water tank 56 into an intake port of each cylinder or into each cylinder. A liquid feeding pump 62 that feeds water from inside the water tank 56 to the injectors 60 is provided between the water tank 56 and the injectors 60.

Further, a drainage passage 64 is connected to the suction passage 38 at a position that is on the downstream side thereof relative to the merging portion with the suction passage 42 and is on the upstream side relative to the condenser 54. A relief valve 66 that is normally closed is provided in the drainage passage 64. Although not illustrated in the drawings, water amount detection means (as one example, a float) for detecting a water amount inside the water tank 56 is mounted in the water tank 56, and the relief valve 66 is opened when the water amount inside the water tank 56 exceeds a predetermined amount. When the relief valve 66 is opened, water vapor flowing through the suction passage 38 flows into the drainage passage 64 on the way toward the condenser 54, and is discharged from the drainage passage 64 to outside of the internal combustion engine 1.

The internal combustion engine 1 illustrated in FIG. 1 further includes an ECU (electronic control unit) 80 as a control device. The ECU 80 includes, for example, a RAM (random access memory), a ROM (read only memory) and a CPU (central processing unit). The ECU 80 performs processing to take in signals of various sensors that are mounted in the vehicle. The various sensors that the ECU 80 takes in signals include at least the aforementioned water amount detection means. The ECU 80 processes the signals of the respective sensors that are taken in, and actuates various actuators in accordance with a predetermined control program. The actuators that are actuated by the ECU 80 include at least the aforementioned throttle valve 20, EGR valve 30, pressure reducing pumps 40 and 44, injectors 60, liquid feeding pump 62 and relief valve 66.

[Water Vapor Separation in First Embodiment]

In the internal combustion engine according to this embodiment, the pressure reducing pumps 40 and 44 shown in FIG. 1 are driven by the ECU 80, and gas amounts that are sent to the suction passages 38 and 42 on the downstream side from the pressure reducing pumps 40 and 44 are kept at a predetermined amount. Consequently, during driving of the pressure reducing pumps 40 and 44, the partial water vapor pressure is lower in a space surrounding the outer wall surface 48b than in a space surrounded by the inner wall surface 48a that is shown in FIG. 3. Accordingly, the water vapor that flows from inside the inner wall surface 48a to the suction passage 38 (or the suction passage 42) is sent to the downstream side beyond the pressure reducing pump 40 (or the pressure reducing pump 44) in the suction passage 38 (or the suction passage 42) and flows toward the condenser 54. On the other hand, water vapor that did not flow into the suction passage 38, that is, water vapor that did not move from the inner wall surface 48a toward the outer wall surface 48b of the module 34 flows through the inside of the inner wall surface 48a together with fresh air and moves toward the compressor 18a that is located downstream of the module 34. Likewise, water vapor that did not flow into the suction passage 42, that is, water vapor that did not move from the inner wall surface 48a toward the outer wall surface 48b of the module 36 flows through the inside of the inner wall surface 48a together with EGR gas and moves toward the EGR cooler 32 that is located downstream of the module 36.

Figure 5:
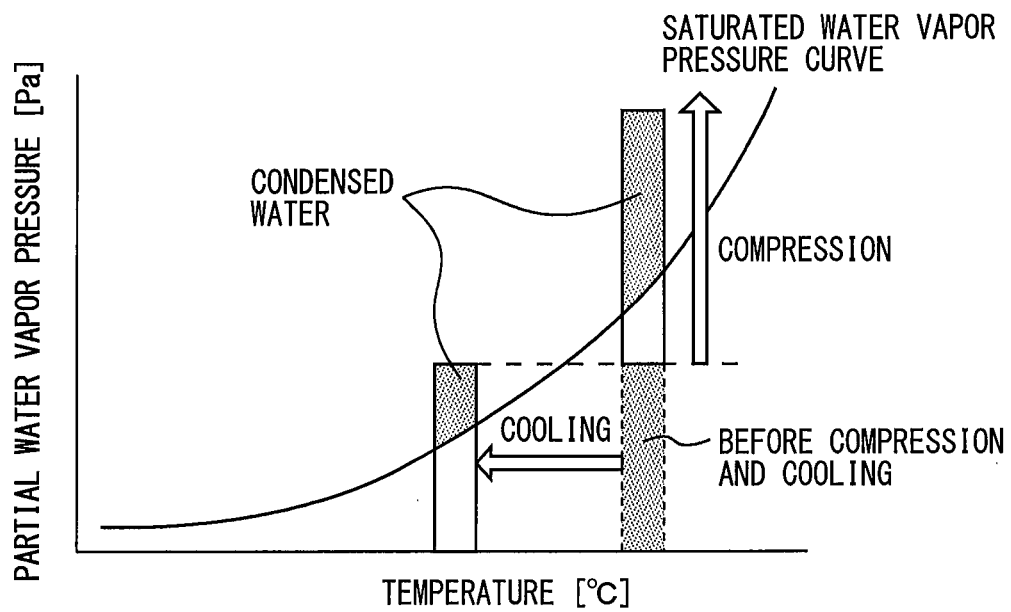
FIG. 5 is a view illustrating a principle regarding generation of condensed water.

FIG. 5 is a view illustrating a principle regarding generation of condensed water. When gas having a relative humidity of less than 100% which is indicated in this drawing by "before cooling" is cooled under an isobaric condition, when the partial water vapor pressure of the gas drops and exceeds the saturated water vapor pressure, condensed water is generated. In accordance with this principle, condensed water is generated when the partial water vapor pressure in gas (refers to fresh air or a mixed gas of fresh air and EGR gas. Hereunder, a mixed gas of fresh air and EGR gas is simply referred to as "mixed gas". Further, fresh air or a mixed gas is referred to as "gas (fresh air or mixed gas).") exceeds the saturated water vapor pressure accompanying cooling at the intercooler 24 shown in FIG. 1. Condensed water is also generated when the partial water vapor pressure in EGR gas exceeds the saturated water vapor pressure accompanying cooling at the EGR cooler 32.

Figure 6:
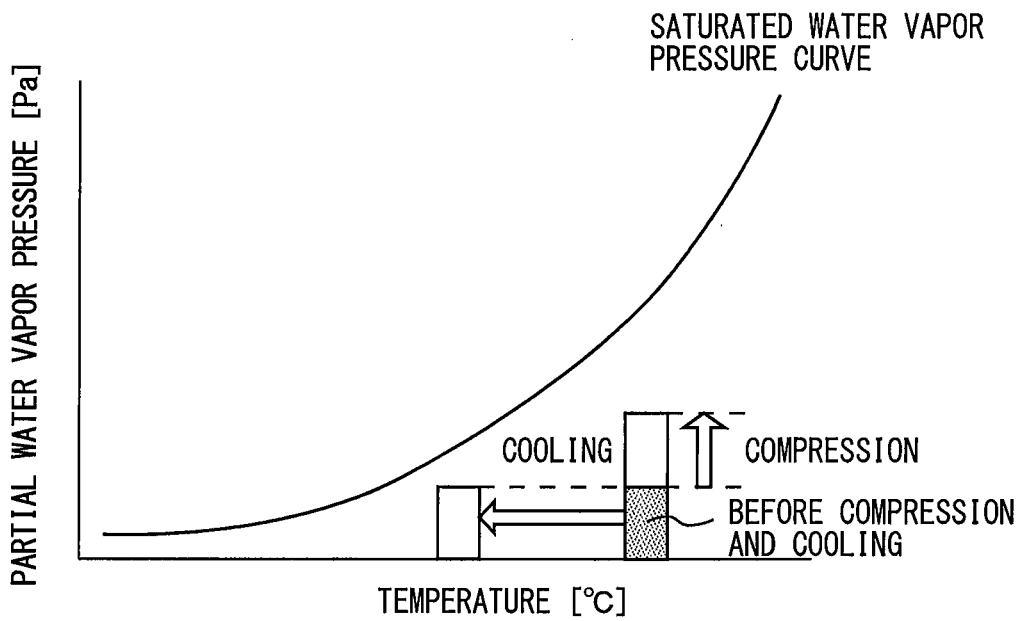
FIG. 6 is a view for describing an effect obtained by the configuration of the internal combustion engine according to the first embodiment of the present disclosure.

In this respect, since the tubular film 48 which has been described referring to FIG. 2 and FIG. 3 has a configuration such that it is difficult for a gas other than water vapor to permeate therethrough, driving the pressure reducing pumps 40 and 44 by means of the ECU 80 allows water vapor to be selectively removed from gas (fresh air or mixed gas) prior to flowing into the intercooler 24 or from EGR gas prior to flowing into the EGR cooler 32. FIG. 6 is a view for describing the effects of the configuration of the internal combustion engine according to the first embodiment of the present disclosure. As will be understood by comparing FIG. 5 and FIG. 6, according to the internal combustion engine of this embodiment it is possible to lower in advance the partial water vapor pressure in gas "before cooling" which is in a state in which condensed water is likely to be generated after cooling. Therefore, the generation of condensed water accompanying cooling at the intercooler 24 or cooling at the EGR cooler 32 which are shown in FIG. 1 can be suppressed.

[Intake Air Cooling in First Embodiment]

Further, in the internal combustion engine according to this embodiment, the injectors 60 and the liquid feeding pump 62 illustrated in FIG. 1 are driven by the ECU 80. Therefore, gas (fresh air or mixed gas) in the intake port of each cylinder or gas (fresh air or mixed gas) in each cylinder is cooled by latent heat of vaporization of water that is injected from the injectors 60. That is, the pre-combustion gas (fresh air or mixed gas) is cooled. When the pre-combustion gas (fresh air or mixed gas) is cooled, the output improves because the volumetric efficiency increases. Further, since the volumetric efficiency increases and the exhaust gas temperature decreases, the fuel consumption improves. Furthermore, since the combustion temperature is lowered, the amount of NOx emissions decreases and the occurrence of knocking is suppressed.

In this case, driving of the injectors 60 and the liquid feeding pump 62 is performed in parallel with driving of the pressure reducing pumps 40 and 44. If only the injectors 60 and the liquid feeding pump 62 are driven without the pressure reducing pumps 40 and 44 being driven, the water amount inside the water tank 56 will gradually decrease. However, when the pressure reducing pumps 40 and 44 are driven in parallel with driving of the injectors 60 and the liquid feeding pump 62, water vapor that is removed from fresh air, and water vapor that is removed from EGR gas will be condensed at the condenser 54, and new water (condensed water) will be replenished into the water tank 56. Accordingly, a situation in which the water amount in the water tank 56 continually decreases is avoided.

Figure 7:
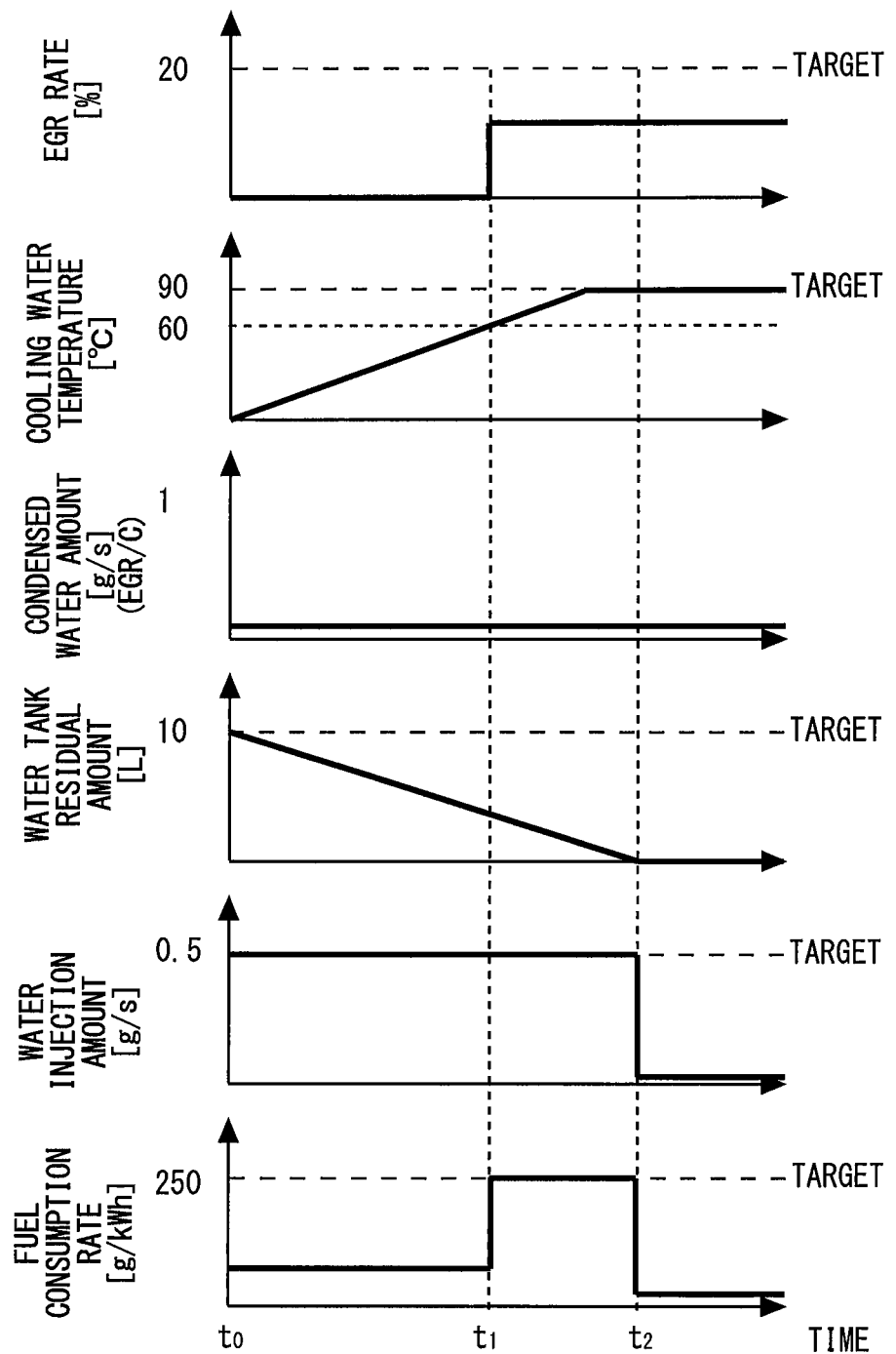
FIG. 7 is a view for describing an effect obtained by the configuration of the internal combustion engine according to the first embodiment of the present disclosure.
Figure 8:
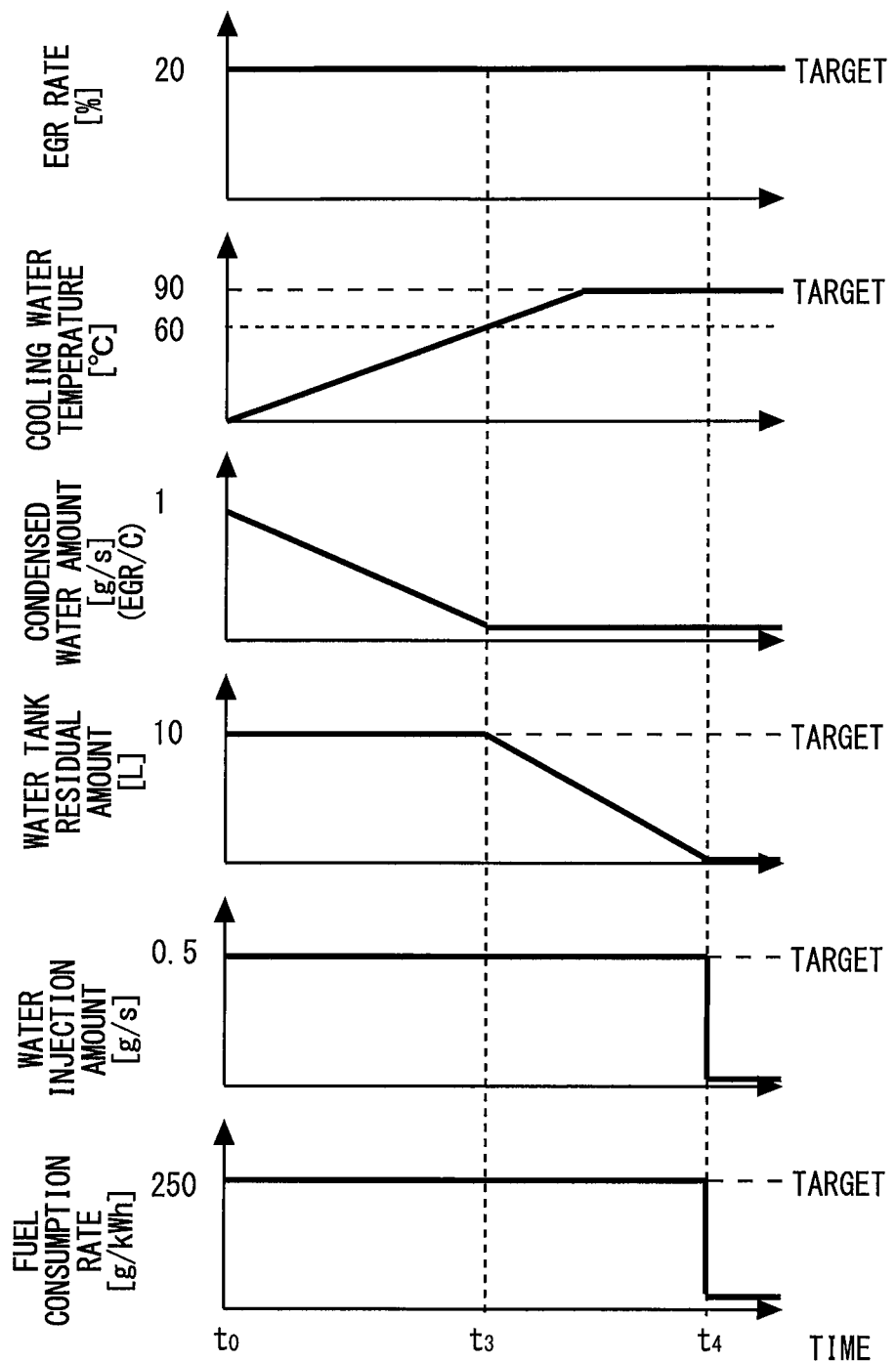
FIG. 8 is a view for describing an effect obtained by the configuration of the internal combustion engine according to the first embodiment of the present disclosure.
Figure 9:
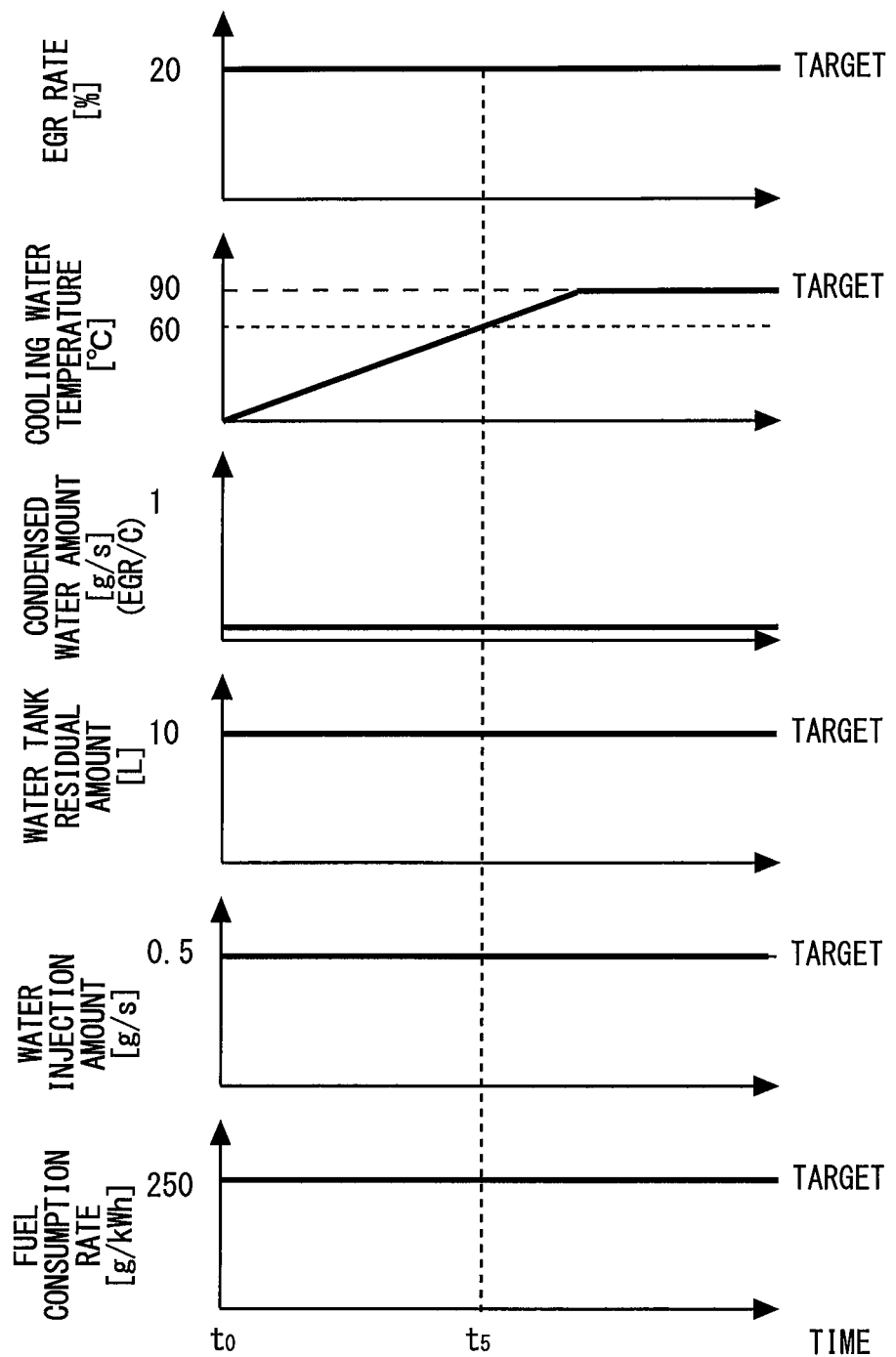
FIG. 9 is a view for describing an effect obtained by the configuration of the internal combustion engine according to the first embodiment of the present disclosure.

FIGS. 7 to 9 are views for describing effects obtained by the configuration of the internal combustion engine according to the first embodiment of the present disclosure. In FIG. 7, transitions in physical quantities relating to water vapor separation and intake air cooling are illustrated with respect to a case where the injectors 60 and the liquid feeding pump 62 are driven in an engine configuration (hereunder, also referred to as "first comparative configuration") that excludes a dehumidifying apparatus consisting of the modules 34 and 36, the suction passages 38 and 42 and the pressure reducing pumps 40 and 44, as well as the condenser 54 from the internal combustion engine 1 illustrated in FIG. 1. In FIG. 8, transitions in the same physical quantities are illustrated with respect to a case where the injectors 60 and the liquid feeding pump 62 are driven in an engine configuration (hereunder, also referred to as "second comparative configuration") that excludes the dehumidifying apparatus consisting of the modules 34 and 36, the suction passages 38 and 42 and the pressure reducing pumps 40 and 44 as well as the condenser 54 from the internal combustion engine 1 illustrated in FIG. 1, and instead recovers condensed water generated at the EGR cooler 32 using the water tank 56. In FIG. 9, transitions in the same physical quantities are illustrated with respect to a case where the injectors 60 and the liquid feeding pump 62 are driven in the engine configuration illustrated in FIG. 1.

As illustrated in FIG. 7, in the first comparative configuration the EGR rate is a value that is near to zero during a period from a time point (time $t_0$) at which the internal combustion engine is started until a time point (time $t_1$) at which the cooling water temperature of the internal combustion engine reaches a warm-up completion temperature (as one example, 60° C.). The reason is that when EGR gas is introduced into the internal combustion engine immediately after startup of the internal combustion engine, condensed water arises accompanying cooling of the EGR gas at the EGR cooler. In this connection, since the EGR rate is made a value that is near to zero so as not to generate condensed water in the EGR cooler, naturally the condensed water amount that is generated at the EGR cooler (condensed water amount (EGR/C)) is a value that is near to zero. Further, as illustrated in FIG. 7, in the first comparative configuration, when the water injection amount of the injector is set to a target value thereof (as one example, 0.5 g/s) from the time $t_0$, the residual amount of water inside the water tank decreases over time. Subsequently, when all of the water in the water tank runs out at a time point of a certain time $t_2$, water injection from the injectors cannot be performed thereafter, and the fuel consumption rate also becomes significantly less than the target value thereof (as one example, 250 g/kWh).

Unlike the first comparative configuration, the second comparative configuration is an engine configuration in which condensed water is actively generated at the EGR cooler. As illustrated in FIG. 8, in the second comparative configuration the EGR rate can be set to the target value (as one example, 20%) thereof from the time point of the time $t_0$. Further, since replenishment of new water (condensed water) can be expected from the EGR cooler, the water injection amount of the injectors can also be set to the target value thereof (as one example, 0.5 g/s) from the time $t_0$. However, since the cooling water temperature of the EGR cooler also increases accompanying an increase in the cooling water temperature of the internal combustion engine, the amount of condensed water generated at the EGR cooler gradually decreases. Further, from the time point (time $t_3$) at which the warm-up completion temperature (as one example, 60° C.) is reached onwards, almost no condensed water is generated at the EGR cooler, and therefore if it is attempted to maintain the water injection amount of the injectors at the target value thereof, the residual amount of water in the water tank will gradually decrease. Subsequently, when all of the water in the water tank runs out at a time point of a certain time $t_4$, water injection from the injectors cannot be performed thereafter, and the fuel consumption rate also becomes significantly less than the target value thereof.

Unlike the above described two comparative configurations, the internal combustion engine 1 illustrated in FIG. 1 has an engine configuration that removes water vapor from EGR gas before the EGR gas flows into an EGR cooler. As illustrated in FIG. 9, in the internal combustion engine 1 illustrated in FIG. 1, the condensed water amount generated at the EGR cooler can be made a value that is near to zero from the time $t_0$ onward also, and therefore the EGR rate can be set to the target value thereof (as one example, 20%) from the time point of the time $t_0$. Further, in the internal combustion engine 1 illustrated in FIG. 1, a configuration is adopted that condenses water vapor removed from EGR gas at a condenser, and uses the resultant condensed water to replenish a water tank. As illustrated in FIG. 9, in the internal combustion engine 1 illustrated in FIG. 1, even if the water injection amount of the injectors is set to the target value thereof (as one example, 0.5 g/s) from the time $t_0$, the residual amount of water in the water tank can be maintained at the target value thereof, and onward from a time point (time $t_5$) at which the warm-up completion temperature (as one example, 60° C.) is reached also, the water injection amount of the injectors can similarly be set to the target value thereof. Therefore, the fuel consumption rate can naturally be maintained at the target value thereof from the time $t_0$ to the time $t_5$, and can also be maintained at the target value thereof from the time $t_5$ onward.

Note that, in the above described first embodiment, the intake passage 12 and the EGR passage 28 illustrated in FIG. 1 correspond to "gas passage" of the present disclosure, the intercooler 24 and the EGR cooler 32 illustrated in FIG. 1 correspond to "cooling portion" of the present disclosure, the tubular film 48 illustrated in FIG. 2 and FIG. 3 corresponds to "water vapor permeable film" of the present disclosure, and the modules 34 and 36 illustrated in FIG. 2 correspond to "water vapor separating portion" of the present disclosure. Further, the suction passages 38 and 42 and the pressure reducing pumps 40 and 44 that are driven by the ECU 80 which are illustrated in FIG. 1 correspond to "pressure reducing portion" of the present disclosure, the condenser 54 corresponds to "water vapor condensing portion" of the present disclosure, and the water tank 56, the supply passage 58, as well as the injectors 60 and the liquid feeding pump 62 that are driven by the ECU 80 which are illustrated in FIG. 1 correspond to "water injecting portion" of the present disclosure.

[Other Configuration Example of Pressure Reducing Portion]

Figure 10:
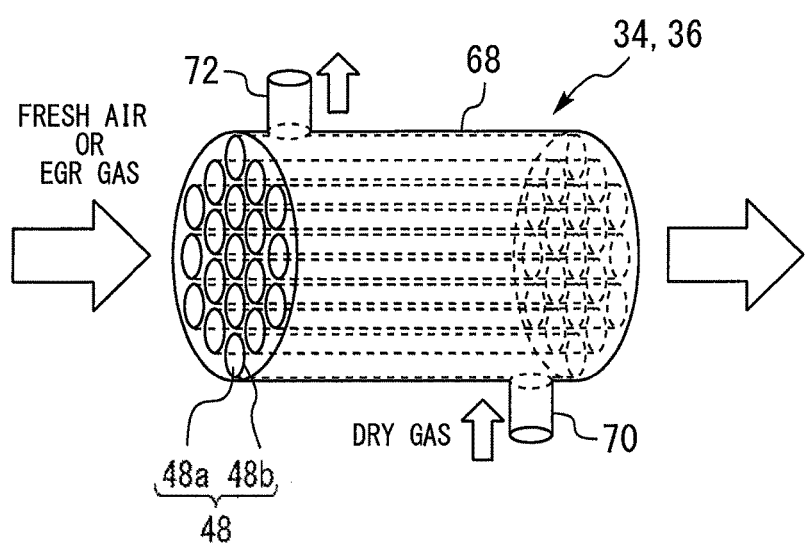
FIG. 10 is a view for describing another means for relatively lowering a partial water vapor pressure in a space surrounding an outer wall surface 48*b*.

In this connection, in the above described first embodiment the partial water vapor pressure in the space surrounding the outer wall surface 48b is made lower than in the space surrounded by the inner wall surface 48a by driving the pressure reducing pumps 40 and 44 that are combined with the modules 34 and 36. However, the partial water vapor pressure in the space surrounding the outer wall surface 48b may be relatively lowered by utilizing different means from the pressure reducing pumps 40 and 44. FIG. 10 is a view for describing other means for relatively lowering the partial water vapor pressure in the space surrounding the outer wall surface 48b. A housing 68 illustrated in the drawing can be provided in the modules 34 and 36 instead of the housing 46 illustrated in FIG. 2. A supply port 70 and a discharge port 72 are formed in a side face of the housing 68. The supply port 70 is connected to a gas supply apparatus (unshown) that sends dry gas (purge gas), and the discharge port 72 is opened to the atmosphere. The configuration of the tubular films 48 of the modules 34 and 36 is the same as the configuration in the foregoing description regarding FIG. 3.

Because the tubular film 48 has a film configuration such that it is difficult for a gas other than water vapor to move through the interior thereof as described above referring to FIG. 4, dry gas that flows into the housing 68 from the supply port 70 when the gas supply apparatus is driven flows along the outer wall surface 48b toward the discharge port 72 without moving through the inside of the tubular film 48. Since the partial water vapor pressure in the space surrounding the outer wall surface 48b becomes lower than the partial water vapor pressure in the space surrounded by the inner wall surface 48a as a result of the dry gas flowing along the outer wall surface 48b, the movement of water vapor that is described above referring to FIG. 4 occurs. Thus, the partial water vapor pressure in the space surrounding the outer wall surface 48b can also be relatively lowered by driving a gas supply apparatus that is combined with the modules 34 and 36.

[Other Configuration Example of Modules]

The foregoing first embodiment was described on the premise that the large number of tubular films 48 included in the module 34 are hollow fiber-type films. However, instead of a hollow fiber-type module structure it is possible to adopt a honeycomb monolith-type module structure, a flat film-type module structure or a shell-and-tube-type module structure. Similarly to the hollow fiber-type module structure, various modifications can be made to the module structure as long as the module structure has a function that can separate only water vapor from fresh air and from EGR gas.

[Other Configuration Example of Internal Combustion Engine]

The foregoing first embodiment was described on the premise of using an LPL-EGR system. However, the present disclosure can also be applied to a non-EGR supercharging system having a configuration that, relative to the LPL-EGR system, excludes the EGR passage 28, the EGR cooler 32 and the like shown in FIG. 1, or to a non-supercharging EGR system having a configuration that, relative to the LPL-EGR system, excludes the turbocharger 18 and the intercooler 24 and the like shown in FIG. 1.

Specifically, when a non-EGR supercharging system is taken as a premise, the engine configuration includes only the module 34 and does not include the module 36. In this case, by driving the pressure reducing pump 40 that is combined with the module 34, while suppressing the generation of condensed water accompanying compression at the compressor 18a or cooling at the intercooler 24 illustrated in FIG. 1, gas (fresh air or mixed gas) in the intake port of each cylinder or gas (fresh air or mixed gas) in each cylinder can be cooled by driving the injectors 60 and the liquid feeding pump 62, and thus the various advantageous effects described above can be obtained.

On the other hand, when a non-supercharging EGR system is taken as a premise, the engine configuration includes the modules 34 and 36 similarly to the internal combustion engine according to the above described first embodiment, or includes only the module 36.

When the engine configuration includes the modules 34 and 36, similarly to the internal combustion engine according to the above described first embodiment, while suppressing the generation of condensed water accompanying cooling at the EGR cooler 32 by driving the pressure reducing pumps 40 and 44 that are combined with the two modules, gas (fresh air or mixed gas) in the intake port of each cylinder or gas (fresh air or mixed gas) in each cylinder can be cooled by driving the injectors 60 and the liquid feeding pump 62, and thus the various advantageous effects described above can be obtained.

When the engine configuration includes only the module 36, while suppressing the generation of condensed water accompanying cooling at the EGR cooler 32 by driving the pressure reducing pump 44 that is combined with the module 36, gas (fresh air or mixed gas) in the intake port of each cylinder or gas (fresh air or mixed gas) in each cylinder can be cooled by driving the injectors 60 and the liquid feeding pump 62, and thus the various advantageous effects described above can be obtained.

Second Embodiment

Next, a second embodiment of the present disclosure will be described referring to FIGS. 11 to 17.

[Description of Configuration of Internal Combustion Engine According to Second Embodiment]

Figure 11:
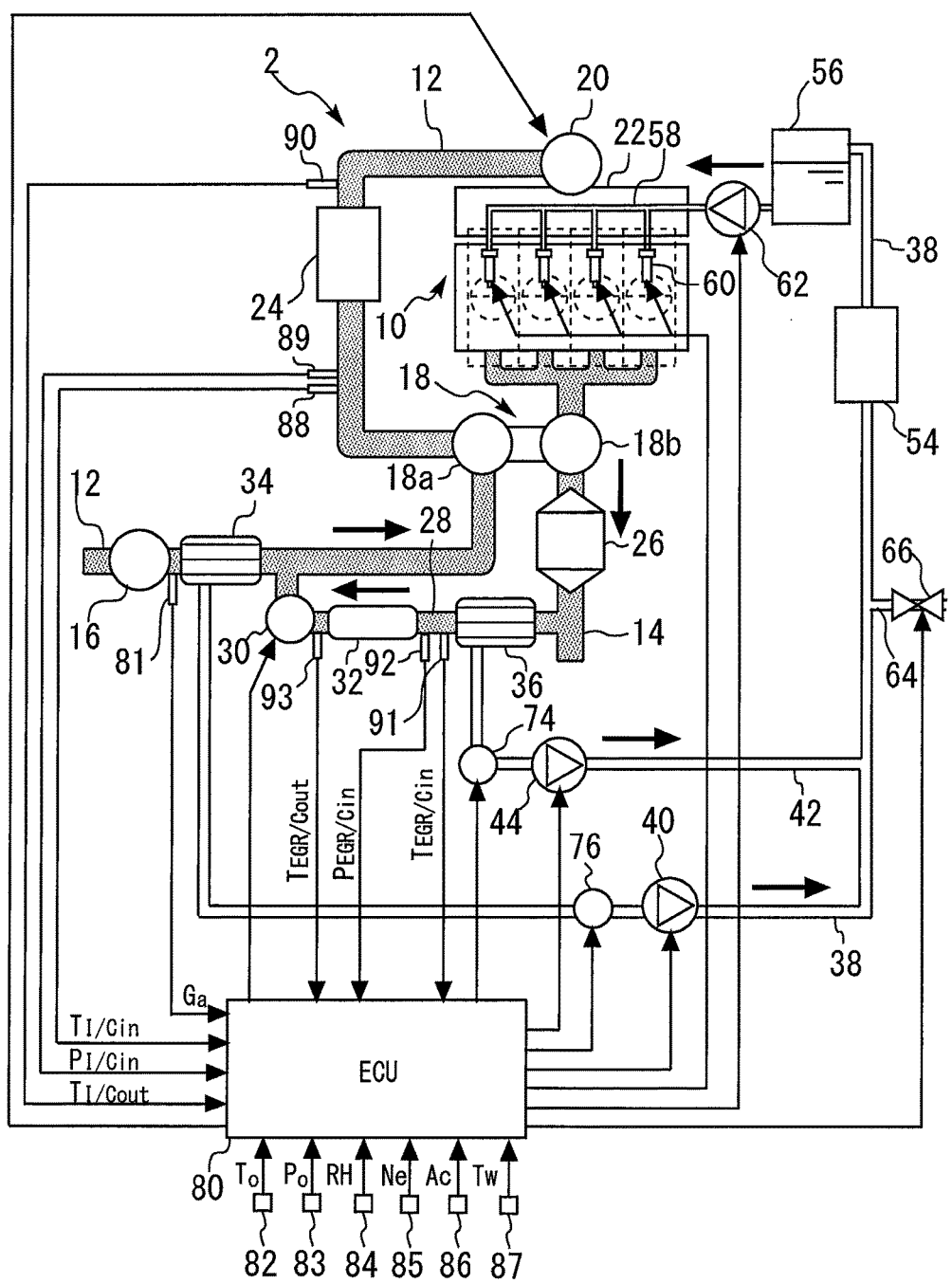
FIG. 11 is a schematic diagram illustrating the overall configuration of an internal combustion engine according to a second embodiment of the present disclosure.

FIG. 11 is a schematic diagram illustrating the overall configuration of an internal combustion engine according to the second embodiment of the present disclosure. An internal combustion engine 2 illustrated in FIG. 11 shares the same configuration as the internal combustion engine 1 illustrated in FIG. 1 with respect to the LPL-EGR system and the configuration equipped with the two water vapor separation film modules (that is, the modules 34 and 36) for fresh air and EGR gas. Therefore, a description of these configurations is omitted here.

The internal combustion engine 2 illustrated in FIG. 11 includes control valves 74 and 76. The control valve 74 is provided in the suction passage 38 on an upstream side relative to the pressure reducing pump 40. The control valve 76 is provided in the suction passage 42 on an upstream side relative to the pressure reducing pump 44. The control valves 74 and 76 are both electronically controlled valves, and are connected to an output side of the ECU 80.

The internal combustion engine 2 illustrated in FIG. 11 includes various sensors that are connected to an input side of the ECU 80 as illustrated in FIG. 11. The various sensors include an air flow meter 81 that is mounted in the vicinity of the air cleaner 16 and detects a fresh air flow rate Ga, a temperature sensor 82 that detects an atmospheric temperature $T_0$, a pressure sensor 83 that detects an atmospheric pressure $P_0$, a humidity sensor 84 that detects an atmospheric humidity RH, a crank angle sensor 85 that detects an engine speed Ne, an accelerator opening degree sensor 86 that detects a depression amount Ac by which an accelerator pedal is depressed by the driver of the vehicle, and a temperature sensor 87 that detects an engine cooling water temperature Tw. The various sensors also include a plurality of temperature sensors and a plurality of pressure sensors that detect a temperature and a pressure of gas (fresh air or mixed gas) that flows into the cylinders of the engine body 10.

Specifically, these sensors are as follows. That is, a temperature sensor 88 that detects a temperature (hereunder, referred to as "pre-I/C temperature") $T_{I/Cin}$ of gas at a position that is on a downstream side of the compressor 18a and on an upstream side of the intercooler 24, a pressure sensor 89 that detects a pressure (hereunder, referred to as "pre-I/C temperature") $P_{I/Cin}$ of gas at a position that is on the downstream side of the compressor 18a and on the upstream side of the intercooler 24, a temperature sensor 90 that detects a temperature (hereunder, referred to as "post-I/C temperature") $T_{I/Cout}$ of gas at a position that is on a downstream side of the intercooler 24, a temperature sensor 91 that detects a temperature (hereunder, referred to as "pre-EGR/C temperature") $T_{EGR/Cin}$ of gas on an upstream side of the EGR cooler 32, a pressure sensor 92 that detects a pressure (hereunder, referred to as "pre-EGR/C pressure") $P_{EGR/Cin}$ of gas on the upstream side of the EGR cooler 32, and a temperature sensor 93 that detects a temperature (hereunder, referred to as "post-EGR/C temperature") $T_{EGR/Cout}$ of gas on a downstream side of the EGR cooler 32.

[Water Vapor Separation and Intake Air Cooling in Second Embodiment]

In the internal combustion engine according to this embodiment, similarly to the internal combustion engine according to the foregoing first embodiment, the pressure reducing pumps 40 and 44 illustrated in FIG. 11 are driven by the ECU 80. Further, the control valves 74 and 76 are fundamentally controlled in an open state by the ECU 80. Accordingly, a gas amount that is sent into the suction passages 38 and 42 on the downstream side of the pressure reducing pumps 40 and 44 is maintained at a predetermined amount, similarly to the internal combustion engine according to the foregoing first embodiment. Further, in the internal combustion engine according to this embodiment, similarly to the internal combustion engine according to the foregoing first embodiment, the injectors 60 and the liquid feeding pump 62 are driven by the ECU 80 illustrated in FIG. 1. Further, driving of the injectors 60 and the liquid feeding pump 62 is performed in parallel with the aforementioned driving of the pressure reducing pumps 40 and 44.

However, unlike the internal combustion engine according to the foregoing first embodiment, in the internal combustion engine according to this embodiment, a value of a gas amount (that is, a value of the aforementioned predetermined amount) to be sent to the suction passages 38 and 42 on the downstream side of the pressure reducing pumps 40 and 44 is set based on a target value of a water amount that is injected from the injectors 60 (hereunder, also referred to as "water injection amount required value"). The water injection amount required value is a value that is calculated based on the operating state of the engine body 10 (for example, the engine speed Ne, engine load, EGR rate, atmospheric humidity RH, and engine cooling water temperature Tw). In this embodiment, it is assumed that the water injection amount required value is calculated based on a map that is stored in a ROM of the ECU 80 that is created in advance by simulation or the like.

[Problem Regarding Internal Combustion Engine According to Second Embodiment]

Figure 12:
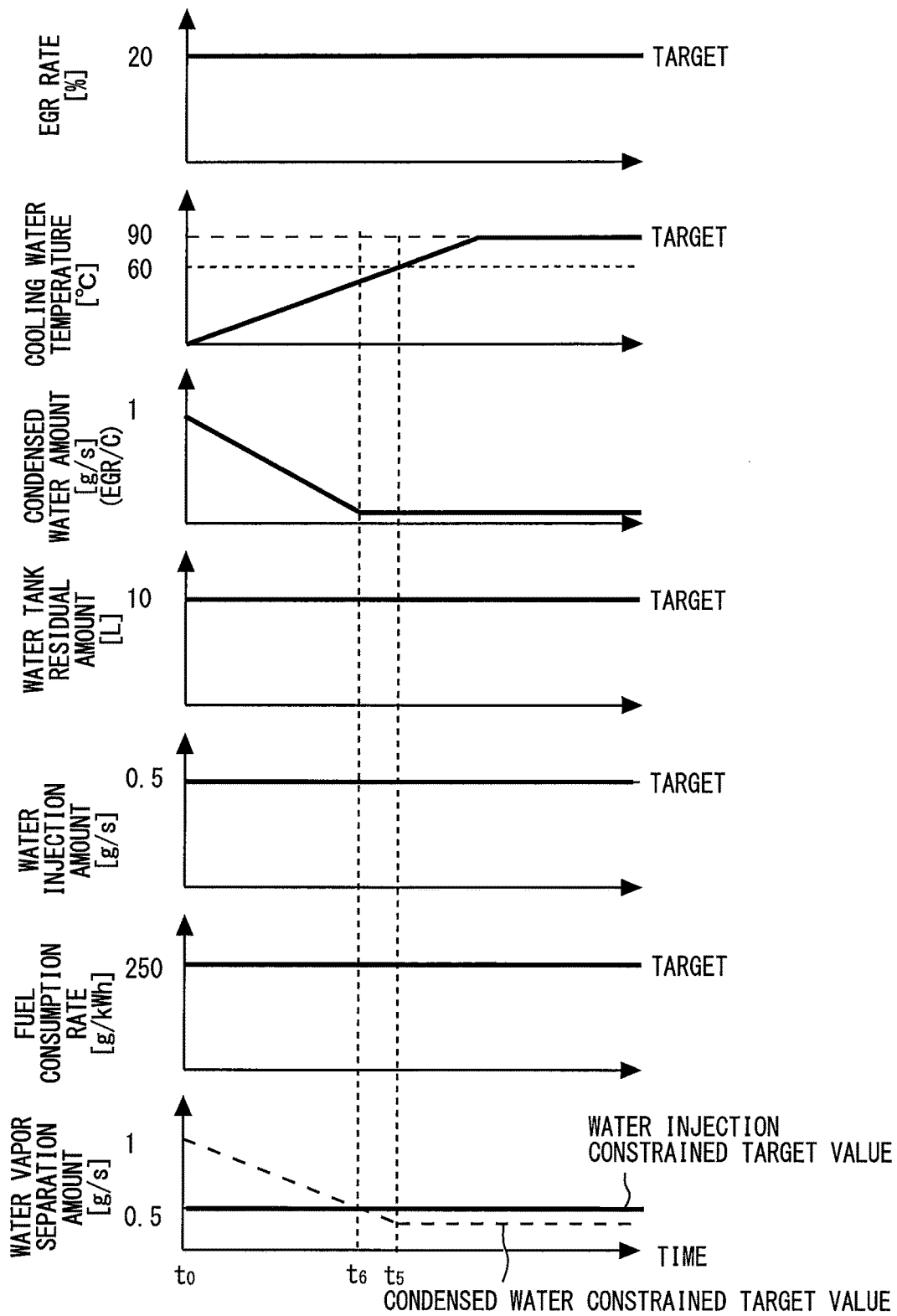
FIG. 12 is a view for describing a problem that arises when the humidity of fresh air or EGR gas is high and also a gas amount sent to suction passages 38 and 42 on a downstream side relative to pressure reducing pumps 40 and 44 is fixed.

FIG. 12 is a view for describing a problem that arises when the humidity of fresh air or EGR gas is high and also a gas amount sent to the suction passages 38 and 42 on the downstream side relative to the pressure reducing pumps 40 and 44 is fixed. In FIG. 12, transitions in physical quantities relating to water vapor separation and intake air cooling are illustrated with respect to a case where the injectors 60 and the liquid feeding pump 62 in the engine configuration illustrated in FIG. 11 are driven. Note that, as will be understood by comparing FIG. 9 and FIG. 12, a water vapor separation amount is added to FIG. 12. The water vapor separation amount is a target value (hereunder, also referred to as "water injection constrained target value") of a water vapor amount to be sent to the suction passages 38 and 42 on the downstream side relative to the pressure reducing pumps 40 and 44, and is set based on the water injection amount required value. In this embodiment, because the water amount in the water tank 56 is kept constant, the water injection constrained target value is set to a value (as one example, 0.5 g/s) that is equal to the water injection amount required value.

As will be understood by comparing the condensed water amounts in FIG. 9 and FIG. 12, in the case illustrated in FIG. 12 condensed water arises at the EGR cooler during a period from the time $t_0$ to a time $t_6$. The reason is that although water vapor separation at the modules 34 and 36 is performed without a problem in the case illustrated in FIG. 9 in which the humidity of fresh air and EGR gas is not so high, the water vapor separation at the respective modules is insufficient in the case illustrated in FIG. 12 in which the humidity of fresh air and EGR gas is high.

Figure 13:
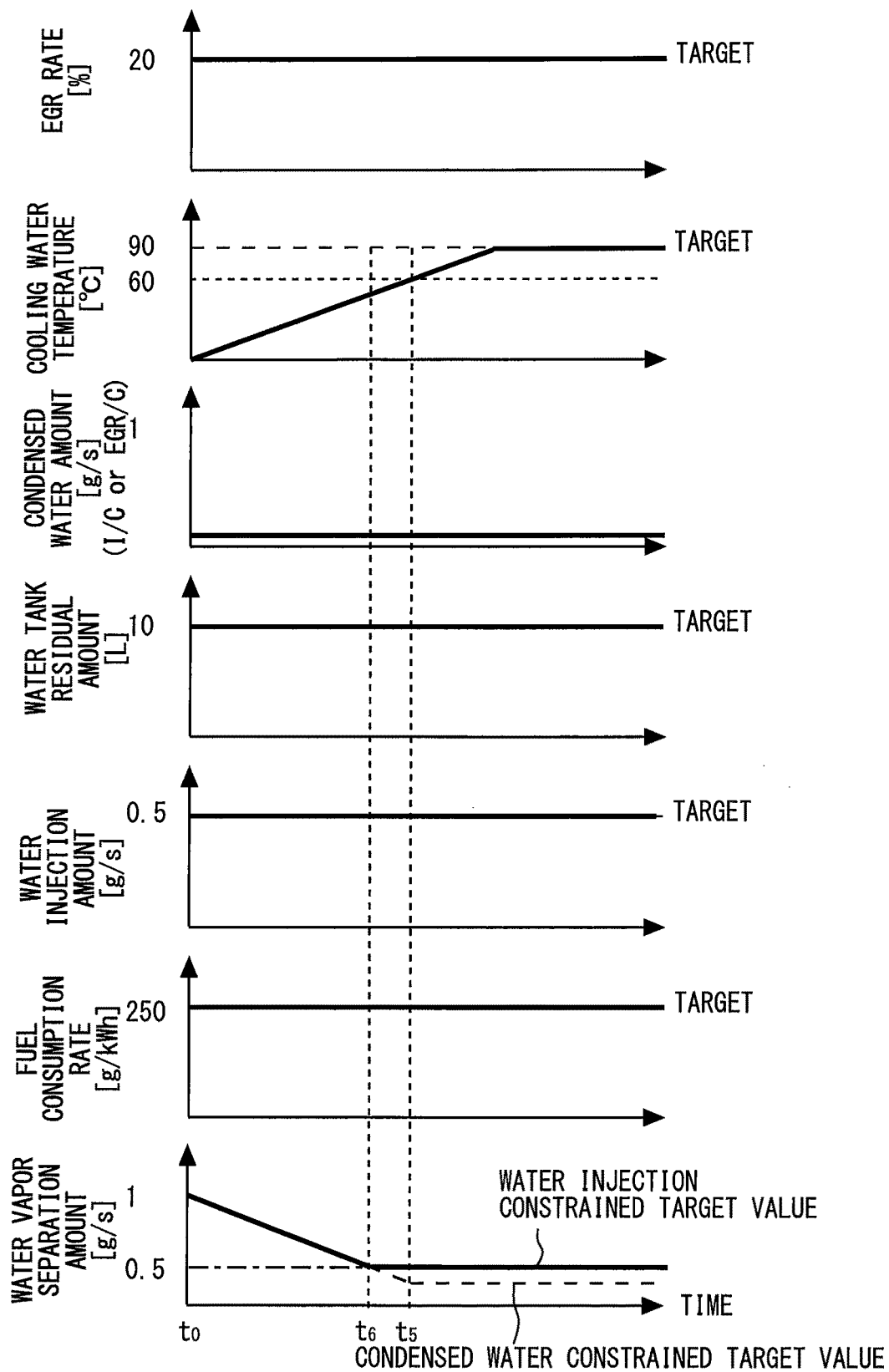
FIG. 13 is a view for describing valve control in the second embodiment of the present disclosure.

To avoid such a situation, in this embodiment a target value of a water vapor amount at which generation of condensed water at the intercooler 24 or the EGR cooler 32 is avoidable (hereunder, also referred to as "condensed water constrained target value") are compared, and the opening degree of the control valves 74 and 76 is adjusted so as to cause the water vapor separation amount to match the larger target value among the aforementioned two target values. In FIG. 13, transitions in physical quantities relating to water vapor separation and intake air cooling are illustrated with respect to a case where the water vapor separation amount is caused to match the larger value among the water injection constrained target value and the condensed water constrained target value. As illustrated in FIG. 13, when the water vapor separation amount is caused to match the condensed water constrained target value during a period from the time $t_0$ until the time $t_6$, and is caused to match the water injection constrained target value from the time $t_6$ onwards, the condensed water amount generated at the intercooler or the EGR cooler can be made a value that is near to zero. In this connection, the reason the residual amount in the water tank 56 is maintained at the target value is that although a greater amount of water vapor is separated during the period from the time $t_0$ to the time $t_6$ than in the period from the time $t_6$ onwards, the relief valve 66 illustrated in FIG. 11 is opened when the water amount in the water tank 56 exceeds a predetermined amount.

The condensed water constrained target value is set based on the partial water vapor pressure in gas (fresh air or mixed gas) downstream of the intercooler 24 and the partial water vapor pressure in EGR gas downstream of the EGR cooler 32. Condensed water arises at the intercooler 24 when the partial water vapor pressure in gas (fresh air or mixed gas) downstream of the intercooler 24 is higher than the saturated water vapor pressure downstream of the intercooler 24. Further, condensed water arises at the EGR cooler 32 when the partial water vapor pressure in EGR gas downstream of the EGR cooler 32 is higher than the saturated water vapor pressure downstream of the EGR cooler 32. Hence, in this embodiment, a condensed water constrained target value such that the partial water vapor pressure in gas (fresh air or mixed gas) downstream of the intercooler 24 becomes lower than the saturated water vapor pressure downstream of the intercooler 24 and such that the partial water vapor pressure in EGR gas downstream of the EGR cooler 32 becomes lower than the saturated water vapor pressure downstream of the EGR cooler 32 is set.

[Specific Processing]

Figure 14:
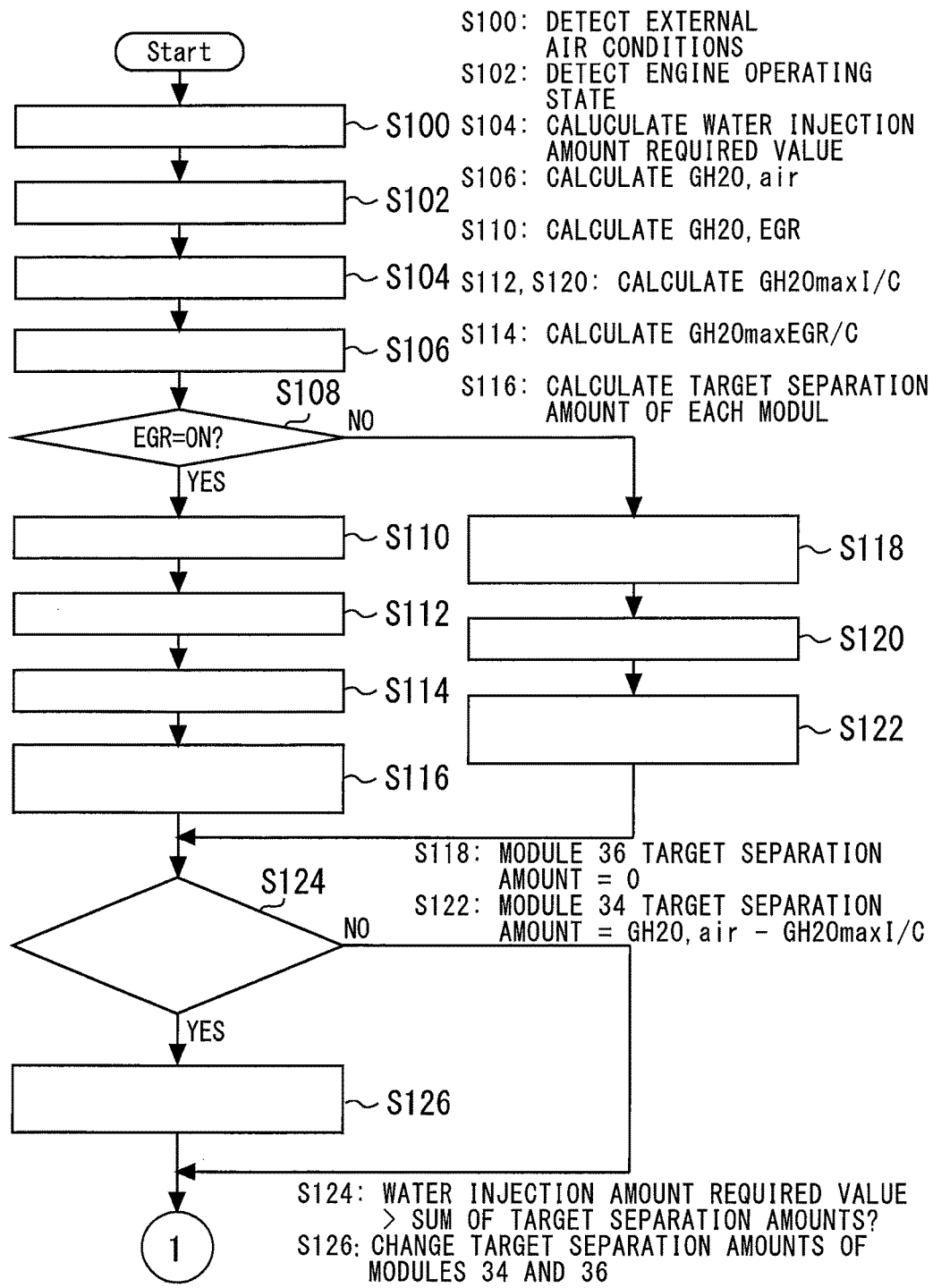
FIG. 14 is a flowchart illustrating an example of processing executed by an ECU 80 in the second embodiment of the present disclosure.
Figure 15:
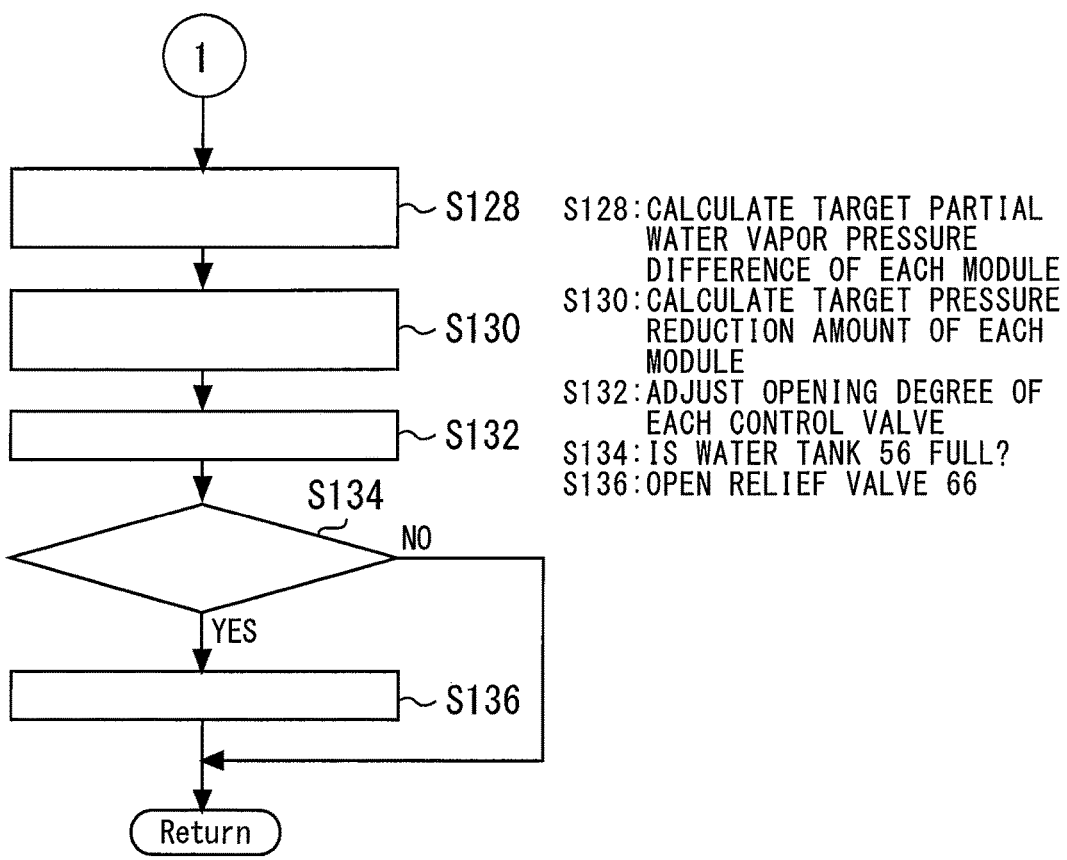
FIG. 15 is a flowchart illustrating an example of processing executed by the ECU 80 in the second embodiment of the present disclosure.
Figure 16:
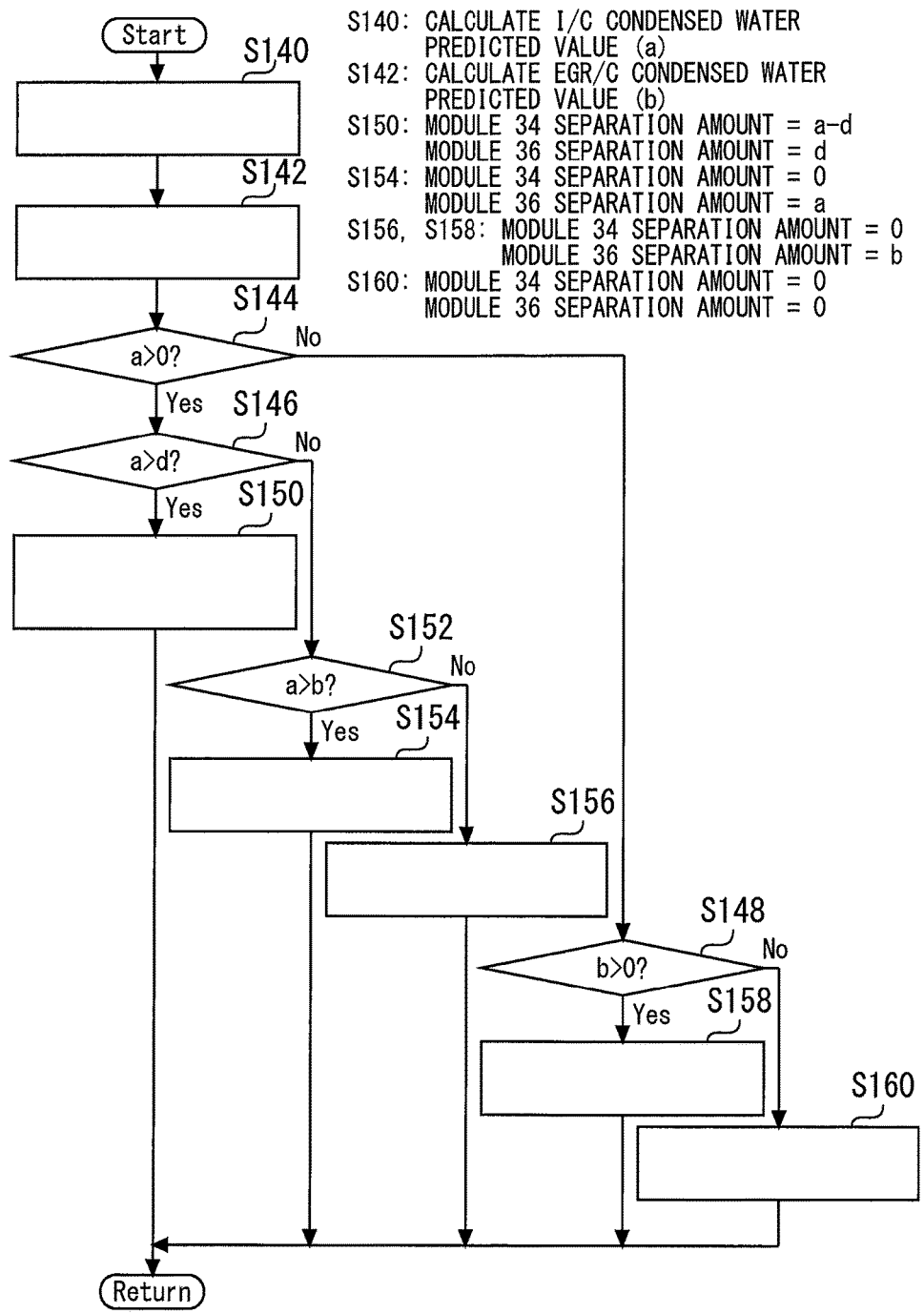
FIG. 16 is a flowchart illustrating an example of processing executed by the ECU 80 in the second embodiment of the present disclosure.

A specific example of valve control that adjusts the opening degree of the control valves 74 and 76 will now be described referring to FIGS. 14 to 16. FIGS. 14 to 16 are flowcharts illustrating an example of processing executed by the ECU 80 in the second embodiment of the present disclosure. Note that, the routines illustrated in these drawings are repeatedly executed at each predetermined control period.

In the routine illustrated in FIG. 14 and FIG. 15, first, external air conditions are detected (step S100). In this step, the ECU 80 detects the atmospheric temperature $T_0$, the atmospheric pressure $P_0$ and the atmospheric humidity RH using the temperature sensor 82, the pressure sensor 83 and the humidity sensor 84.

Next, the engine operating state is detected (step S102). In this step, the ECU 80 detects information that is necessary for calculating the water injection constrained target value and the condensed water constrained target value. Specifically, the ECU 80 detects the engine speed Ne, the depression amount Ac of the accelerator pedal, the engine cooling water temperature Tw, the fresh air flow rate Ga, the pre-I/C temperature $T_{I/Cin}$, the pre-I/C pressure $P_{I/Cin}$, the post-I/C temperature $T_{I/Cout}$, the pre-EGR/C temperature $T_{EGR/Cin}$, the pre-EGR/C pressure $P_{EGR/Cin}$ and the post-EGR/C temperature $T_{EGR/Cout}$. These parameters are acquired from the various sensors described above. Further, the ECU 80 detects an EGR gas flow rate $G_{EGR}$ that flows into the intake passage 12 from the EGR passage 28, and a fuel flow rate GF that is injected to the cylinders. The ECU 80 also calculates the engine load based on the depression amount Ac of the accelerator pedal, and calculates the EGR rate using the EGR gas flow rate GEGR and the fresh air flow rate Ga.

Next, the water injection amount required value is calculated (step S104). In the present step, the ECU 80 calculates the water injection amount required value (that is, the water injection constrained target value) based on detection values or calculated values obtained in step S100 or step S102 and the aforementioned map.

Next, a water vapor flow rate $G_{H2O,air}$ in the fresh air is calculated (step S106). The water vapor flow rate $G_{H2O,air}$ is a flow rate of water vapor included in fresh air that flows through the intake passage 12 on an upstream side relative to the module 34. In the present step, the ECU 80 calculates the water vapor flow rate $G_{H2O,air}$ based on values detected in step S100 or step S102 and the following equation (1).

Water vapor flow rate $G_{H2O,air}$ [g/s]=fresh air flow rate Ga [g/s]×(atmospheric saturated water vapor pressure [kPa]×atmospheric humidity RH/atmospheric pressure $P_0$)×($H_2O$ molecular weight [g/mol]/fresh air molecular weight [g/mol]) (1)

Note that, in equation (1), the fresh air molecular weight and the $H_2O$ molecular weight are set values, and the atmospheric saturated water vapor pressure is separately calculated based on the atmospheric temperature $T_0$ detected in step S100.

Next, whether or not EGR gas is being introduced is determined (step S108). In the present step, the ECU 80 determines whether or not EGR gas is being introduced into the intake passage 12 from the EGR passage 28 based on detection values or calculated values obtained in step S100 or step S102 (for example, the engine speed Ne and the engine load, or the EGR rate). If it is determined as a result that EGR gas is being introduced ("Yes"), the process proceeds to step S110, while if it is determined that EGR gas is not being introduced ("No"), the process proceeds to step S118.

In step S110, a water vapor flow rate $G_{H2O,EGR}$ contained in the EGR gas is calculated. The water vapor flow rate $G_{H2O,EGR}$ is the flow rate of water vapor included in EGR gas that flows through the EGR passage 28 on the upstream side relative to the module 36. In the present step, the ECU 80 calculates the water vapor flow rate $G_{H2O,EGR}$ based on the detected values in step S100 or step S102 and the following equations (2) to (4).

Water vapor flow rate $G_{H2O,EGR}$ [g/s]=EGR gas flow rate $G_{EGR}$ [g/s]×proportion of water vapor in EGR gas×($H_2O$ molecular weight [g/mol]/exhaust gas molecular weight [g/mol]) (2)

Proportion of water vapor in EGR gas = proportion of water vapor in exhaust gas = water vapor flow rate $G_{H2O,CG}$ [g/s] of combustion gas/(fresh air flow rate Ga [g/s] + water injection amount [g/s] from injectors 60 + fuel rate GF [g/s]) (3)

Water vapor flow rate $G_{H2O,CG}$ [g/s] of combustion gas = water vapor flow rate $G_{H2O,air}$ [g/s] + water injection amount [g/s] from injectors 60 + fuel flow rate GF [g/s] × (8 × $H_2O$ molecular weight [g/mol]/fuel molecular weight [g/mol]) (4)

Note that, the exhaust gas molecular weight in equation (2) and the fuel molecular weight in equation (4) are set values that are separately calculated based on the following reaction formula (5) when it is assumed that the fuel used is heptane, and the coefficient of the $H_2O$ molecular weight in equation (4) is also based on reaction formula (5). Naturally, the exhaust gas molecular weight in equation (2) and the fuel molecular weight in equation (4) change according to the fuel that is used.

$$C_7H_{16}+11O_2 \rightarrow 7CO_2+8H_2O \qquad (5)$$

Next, a saturated water vapor flow rate $G_{H2Omax,I/C}$ and a saturated water vapor flow rate $G_{H2Omax,EGR/C}$ are calculated (steps S112 and S114). In these steps, the ECU 80 substitutes the values detected in step S100 or step S102 into the following equations (6) and (7) to calculate the saturated water vapor flow rate $G_{H2Omax,I/C}$ and the saturated water vapor flow rate $G_{H2Omax,EGR/C}$.

Saturated water vapor flow rate $G_{H2Omax,I/C}$=mixed gas flow rate [g/s]×(saturated water vapor pressure [kPa] of mixed gas/pre-I/C pressure $P_{I/Cin}$ [kPa])×($H_2O$ molecular weight [g/mol]/molecular weight of mixed gas [g/mol]) (6)

Saturated water vapor flow rate $G_{H2Omax,EGR/C}$=EGR gas flow rate [g/s]×(saturated water vapor pressure of EGR gas [kPa]/pre-EGR/C pressure $P_{EGR/Cin}$ [kPa])×($H_2O$ molecular weight [g/mol]/molecular weight of mixed gas [g/mol]) (7)

Note that, the molecular weight of mixed gas in equations (6) and (7) is a set value that is calculated based on the fresh air molecular weight and the exhaust gas molecular weight in equation (2). Further, the saturated water vapor pressure of mixed gas in equation (6) is separately calculated based on the post-I/C temperature $T_{I/Cout}$. Likewise, the saturated water vapor pressure of EGR gas in equation (7) is calculated based on the post-EGR/C temperature $T_{EGR/Cout}$.

Next, a target separation amount of water vapor in each module is calculated (step S116). The details of the processing in the present step will be described referring to FIG. 16. In the routine illustrated in FIG. 16, first, a predicted value a of condensed water that is generated accompanying cooling at the intercooler 24 is calculated (step S140). In the present step, the ECU 80 calculates the predicted value a by substituting the water vapor flow rate $G_{H2O,air}$ calculated in step S106, the water vapor flow rate $G_{H2O,EGR}$ calculated in step S110 and the saturated water vapor flow rate $G_{H2Omax,I/C}$ calculated in step S112 in FIG. 14 into the following equation (8).

Predicted value a [g/s]=(water vapor flow rate $G_{H2O,air}$ [g/s]+water vapor flow rate $G_{H2O,EGR}$ [g/s])−saturated water vapor flow rate $G_{H2Omax,I/C}$ [g/s] (8)

Next, a predicted value b of condensed water that is generated accompanying cooling at the EGR cooler 32 is calculated (step S142). In the present step the ECU 80 calculates the predicted value b by substituting the water vapor flow rate $G_{H2O,EGR}$ calculated in step S110 and the saturated water vapor flow rate $G_{H2Omax,EGR/C}$ calculated in step S114 in FIG. 14 into the following equation (9).

Predicted value b [g/s]=water vapor flow rate $G_{H2O,EGR}$ [g/s]−saturated water vapor flow rate $G_{H2Omax,EGR/C}$ [g/s] (9)

Next, the ECU 80 determines whether or not the relation a>0 holds with respect to the predicted value a calculated in step S140 (step S144). If it is determined as a result that the relation a>0 holds ("Yes"), it can be predicted that condensed water will be generated accompanying cooling at the intercooler 24 unless moisture is removed at the module 34, and hence the process proceeds to step S146. On the other hand, if it is determined that the relation a>0 does not hold ("No"), it can be predicted that condensed water will not be generated accompanying cooling at the intercooler 24 even if moisture is not removed at the module 34, and hence the process proceeds to step S148.

In step S146, it is determined whether or not the relation a>d holds with respect to the predicted value a calculated in step S140. The value that is compared with the predicted value a in the present step is a separation limit value d of the module 36, specifically, a value that is set based on the following equation (10).

$$\text{Separation limit value } d \text{ [g/s]=permeability coefficient } P_{H2O,EGR} \text{ [g/(s·m·kPa)]} \times \text{film area } A_{EGR} \text{ [m}^2\text{]} \times \text{maximum differential pressure } \Delta P_{H2Omax,EGR} \text{ [kPa] of partial water vapor pressure/film thickness } \delta_{EGR} \text{ [m]} \quad (10)$$

Note that, the permeability coefficient $P_{H2O,EGR}$ in equation (10) is a unique coefficient of the tubular film 48 described above referring to FIG. 2. Further, the film area $A_{EGR}$ and the film thickness $\delta_{EGR}$ correspond to the film area and film thickness of the tubular film 48, respectively. Further, the maximum differential pressure $\Delta P_{H2Omax,EGR}$ corresponds to a partial water vapor pressure difference that arises between the two spaces separated by the tubular film 48 at a time that a gas amount which is sent from the pressure reducing pump 44 is made a maximum amount.

If it is determined that the relation a>d holds in step S146 ("Yes"), since it can be predicted that removal of moisture is required at both of the modules 34 and 36, the process proceeds to step S150. In step S150, the target separation amount of water vapor at the module 36 is set to a value that is equal to the separation limit value d, and the target separation amount of water vapor at the module 34 is set to a value that is equal to the difference between the predicted value a and the separation limit value d. In contrast, if it is determined that the relation a>d does not hold in step S146 ("No"), it can be predicted that if moisture is removed at the module 36, even if moisture is not removed at the module 34, condensed water will not be generated accompanying cooling at the intercooler 24, and hence the process proceeds to step S152.

In step S152, the ECU 80 determines whether or not the relation a>b holds with respect to the predicted value a calculated in step S140 and the predicted value b calculated in step S142. If it is determined as a result that the relation a>b holds ("Yes"), since it can be predicted that condensed water will not be generated accompanying cooling at the intercooler 24 if a large amount of moisture is removed beforehand at the module 36, the process proceeds to step S154 in which the target separation amount of water vapor at the module 36 is set to a value that is equal to the predicted value a and the target separation amount of water vapor at the module 34 is set to zero. In contrast, if it is determined that the relation a>b does not hold ("No"), the process proceeds to step S156 in which the target separation amount of water vapor at the module 36 is set to a value that is equal to the predicted value b and the target separation amount of water vapor at the module 34 is set to zero.

In step S148, the ECU 80 determines whether or not the relation b>0 holds with respect to the predicted value b calculated in step S142. If it is determined as a result that the relation b>0 holds ("Yes"), since it can be predicted that condensed water will be generated accompanying cooling at the EGR cooler 32 unless moisture is removed at the module 36, the process proceeds to step S158 in which the target separation amount of water vapor at the module 36 is set to a value that is equal to the predicted value b and the target separation amount of water vapor at the module 34 is set to zero. In contrast, if it is determined that the relation b>0 does not hold ("No"), since it can be predicted that condensed water will not be generated accompanying cooling at the EGR cooler 32 even if moisture is not removed at the module 36, the process proceeds to step S160 in which the target separation amount of water vapor at both of the modules 34 and 36 is set to zero.

Returning to FIG. 14, in steps S118 to S122, a target separation amount of water vapor at each module in a case in which EGR gas is not introduced into the intake passage 12 is calculated. Specifically, in step S118, the target separation amount of water vapor at the module for EGR gas, that is, the module 36, is set to zero. The reason is simply that EGR gas is not introduced. Next, in step S120, the saturated water vapor flow rate $G_{H2Omax,I/C}$ is calculated. The processing in the present step is the same as the processing in step S112. Next, in step S122, the target separation amount of water vapor at the module for fresh air, that is, the module 34, is calculated by substituting the water vapor flow rate $G_{H2O,I/C}$ calculated in step S106 and the saturated water vapor flow rate $G_{H2Omax,I/C}$ calculated in step S120 into the following equation (11).

$$\text{Target separation amount of water vapor at module } 34 G_{H2O,I/C} \text{ [g/s]} - G_{H2Omax,I/C} \text{ [g/s]} \quad (11)$$

Following step S116 or step S122, the ECU 80 determines whether or not the water injection amount required value is greater than the sum of the target separation amounts of water vapor of the respective modules (step S124). In the present step, the ECU 80 compares the water injection amount required value that is calculated in step S104 and the sum of the target separation amounts of water vapor at the modules 34 and 36 that are calculated in step S116. The ECU 80 also compares the water injection amount required value calculated in step S104 and the target separation amount of water vapor at the module 34 that is calculated in step S122.

The water injection amount required value calculated in step S104 is equal to the water injection constrained target value as already described in the foregoing. Further, the sum of the target separation amounts for water vapor at the modules 34 and 36 that are calculated in step S116, or the target separation amount of water vapor at the module 34 that is calculated in step S122 corresponds to the condensed water constrained target value. That is, in step S124, the water injection constrained target value and the condensed water constrained target value are compared. If it is determined as a result of comparing the two values in step S124 that the water injection constrained target value is greater than the condensed water constrained target value (when the result is "Yes"), the processing proceeds to step S126, and if the determined result is otherwise (when the result is "No"), the processing skips step S126 and proceeds to step S128.

In step S126, the target separation amount of water vapor at each module is changed according to the following equation (12) or (13) in accordance with whether or not introduction of EGR gas is performed. In the present step, if introduction of EGR gas is performed, the ECU 80 changes the target separation amount of water vapor at the module 36 in accordance with the following equation (12), and if introduction of EGR gas is not performed, the ECU 80 changes the target separation amount of water vapor at the module 34 in accordance with the following equation (13).

Target separation amount of water vapor at module 36=water injection amount required value−target separation amount of water vapor at module 34     (12)

Target separation amount of water vapor at module 34=water injection amount required value     (13)

Next, a target partial water vapor pressure difference at each module is calculated (step S128). In the present step, the ECU 80 substitutes the target separation amount calculated in step S116 (or the target separation amount after being changed in step S126) when introduction of EGR gas is performed into the following equations (14) and (15) to thereby calculate the target partial water vapor pressure difference at each module. When introduction of EGR gas is not performed, the ECU 80 substitutes the target separation amount calculated in step S122 (or the target separation amount after being changed in step S126) into the following equation (16) to thereby calculate the target partial water vapor pressure difference at the module 34.

Target partial water vapor pressure difference [kPa] at module 34=target separation amount of water vapor [g/s] at module 34×film thickness $\delta_{air}$ [m]/permeability coefficient $P_{H2O,air}$ [g/(s·m·kPa)]/film area $A_{air}$ [m²]     (14)

Target partial water vapor pressure difference [kPa] at module 36=target separation amount of water vapor [g/s] at module 36×film thickness $\delta_{EGR}$ [m]/permeability coefficient $P_{H2O,EGR}$ [g/(s·m·kPa)]/film area $A_{EGR}$ [m²]     (15)

Note that, the permeability coefficient $P_{H2O,air}$ in equation (14) is the same value as the permeability coefficient $P_{H2O,EGR}$ in equation (15). Further, the film thickness $\delta_{air}$ and the film area $A_{air}$ in equation (14) are the same values as the film area $A_{EGR}$ and the film thickness $\delta_{EGR}$ in equation (15), respectively.

Next, the ECU 80 calculates a target pressure reduction amount at each module (step S130). In the present step, the ECU 80 substitutes the target partial water vapor pressure difference for each module calculated in step S128 and the like into the following equations (17) and (18) to thereby calculate the target pressure reduction amount at each module.

Target pressure reduction amount [kPa] at module 34=target partial water vapor pressure difference [kPa] at module 34−atmospheric pressure $P_0$ [kPa]×atmospheric humidity $RH$     (17)

Target pressure reduction amount [kPa] at module 36=target partial water vapor pressure difference [kPa] at module 36−pre-EGR/C pressure $P_{EGR/Cin}$ [kPa]×proportion of water vapor in EGR gas     (18)

Note that, the proportion of water vapor in EGR gas in equation (18) is calculated based on equation (3).

Next, the opening degree of each control valve is adjusted (step S132). In the present step, the ECU 80 adjusts the respective opening degrees of the control valves 74 and 76 by feedback control until reaching the target pressure reduction amounts for each module that were calculated in step S130.

Next, it is determined whether or not the water amount in the water tank 56 is equal to or greater than a predetermined amount (step S134). In this step, the ECU 80 determines whether or not the water amount in the water tank 56 is equal to or greater than the predetermined amount based on a detected value from the water amount detection means. If it is determined as a result that the water amount in the water tank 56 is equal to or greater than the predetermined amount (when the result is "Yes"), it is determined that the available capacity of the water tank 56 is insufficient, and therefore the relief valve 66 is opened (step S136). Thereby, water vapor that flows through the suction passage 38 flows into the drainage passage 64 on the way toward the condenser 54 and is thereby discharged to outside of the internal combustion engine 1.

As described above, according to the routines illustrated in FIGS. 14 to 16, when the partial water vapor pressure in gas (fresh air or mixed gas) downstream of the intercooler 24 is higher than the saturated water vapor pressure at the pre-I/C temperature $T_{I/Cin}$, the partial water vapor pressure in the aforementioned gas (fresh air or mixed gas) can be made equal to the saturated water vapor pressure at the pre-I/C temperature $T_{I/Cin}$. Since the post-I/C temperature $T_{I/Cout}$ is lower than the pre-I/C temperature $T_{I/Cin}$, the saturated water vapor pressure at the post-I/C temperature $T_{I/Cout}$ becomes lower than the saturated water vapor pressure at the pre-I/C temperature $T_{I/Cin}$. Accordingly, when the partial water vapor pressure in gas (fresh air or mixed gas) downstream of the intercooler 24 is made equal to the saturated water vapor pressure at the pre-I/C temperature $T_{I/Cin}$, the partial water vapor pressure in question becomes lower than the saturated water vapor pressure at the post-I/C temperature $T_{I/Cout}$. Thus, according to the routines illustrated in FIGS. 14 to 16, when the partial water vapor pressure in gas (fresh air or mixed gas) downstream of the intercooler 24 is higher than the saturated water vapor pressure at the post-I/C temperature $T_{I/Cout}$, the partial water vapor pressure in the aforementioned gas (fresh air or mixed gas) can be made lower than the saturated water vapor pressure at the post-I/C temperature $T_{I/Cout}$. Therefore, the generation of condensed water accompanying with cooling at the intercooler 24 can be suppressed.

Further, according to the routines illustrated in FIGS. 14 to 16, when the partial water vapor pressure in EGR gas downstream of the EGR cooler 32 is higher than the saturated water vapor pressure at the pre-EGR/C temperature $T_{EGR/Cin}$, the partial water vapor pressure in the EGR gas can be made equal to the saturated water vapor pressure at the pre-EGR/C temperature $T_{EGR/Cin}$. Since the post-EGR/C temperature $T_{EGR/Cout}$ is lower than the pre-EGR/C temperature $T_{EGR/Cin}$, the saturated water vapor pressure at the post-EGR/C temperature $T_{EGR/Cout}$ becomes lower than the saturated water vapor pressure at the pre-EGR/C temperature $T_{EGR/Cin}$. Accordingly, when the partial water vapor pressure in EGR gas downstream of the EGR cooler 32 is made equal to the saturated water vapor pressure at the pre-EGR/C temperature $T_{EGR/Cin}$, the partial water vapor pressure in question becomes lower than the saturated water vapor pressure at the post-EGR/C temperature $T_{EGR/Cout}$. Thus, according to the routines illustrated in FIGS. 14 to 16, when the partial water vapor pressure in EGR gas downstream of the EGR cooler 32 is higher than the saturated water vapor pressure at the post-EGR/C temperature $T_{EGR/Cout}$, the partial water vapor pressure in the EGR gas in question can be made lower than the saturated water vapor pressure at the post-EGR/C temperature $T_{EGR/Cout}$. Accordingly, generation of condensed water accompanying cooling at the EGR cooler 32 can also be suppressed.

Further, according to the routines illustrated in FIGS. 14 to 16, when it is determined that the water injection constrained target value is greater than the condensed water constrained target value, the target separation amount of water vapor at each module is changed. If the water injection constrained target value becomes greater than the condensed water constrained target value, the water amount in the water tank 56 will gradually decrease. In this respect, according to the routines illustrated in FIGS. 14 to 16, since the target separation amount of water vapor at each module can be changed, the residual amount in the water tank 56 can be maintained at the target value thereof.

Note that, in the above described second embodiment, the water tank 56 illustrated in FIG. 11 corresponds to "condensed water reservoir portion" of the present disclosure. Further, a "pressure reduction amount adjustment portion" of the present disclosure is realized by the ECU 80 executing the processing in the routines illustrated in FIGS. 14 to 16.

[Another Example of Calculation of Target Separation Amount of Water Vapor of Each Module]

Figure 17:
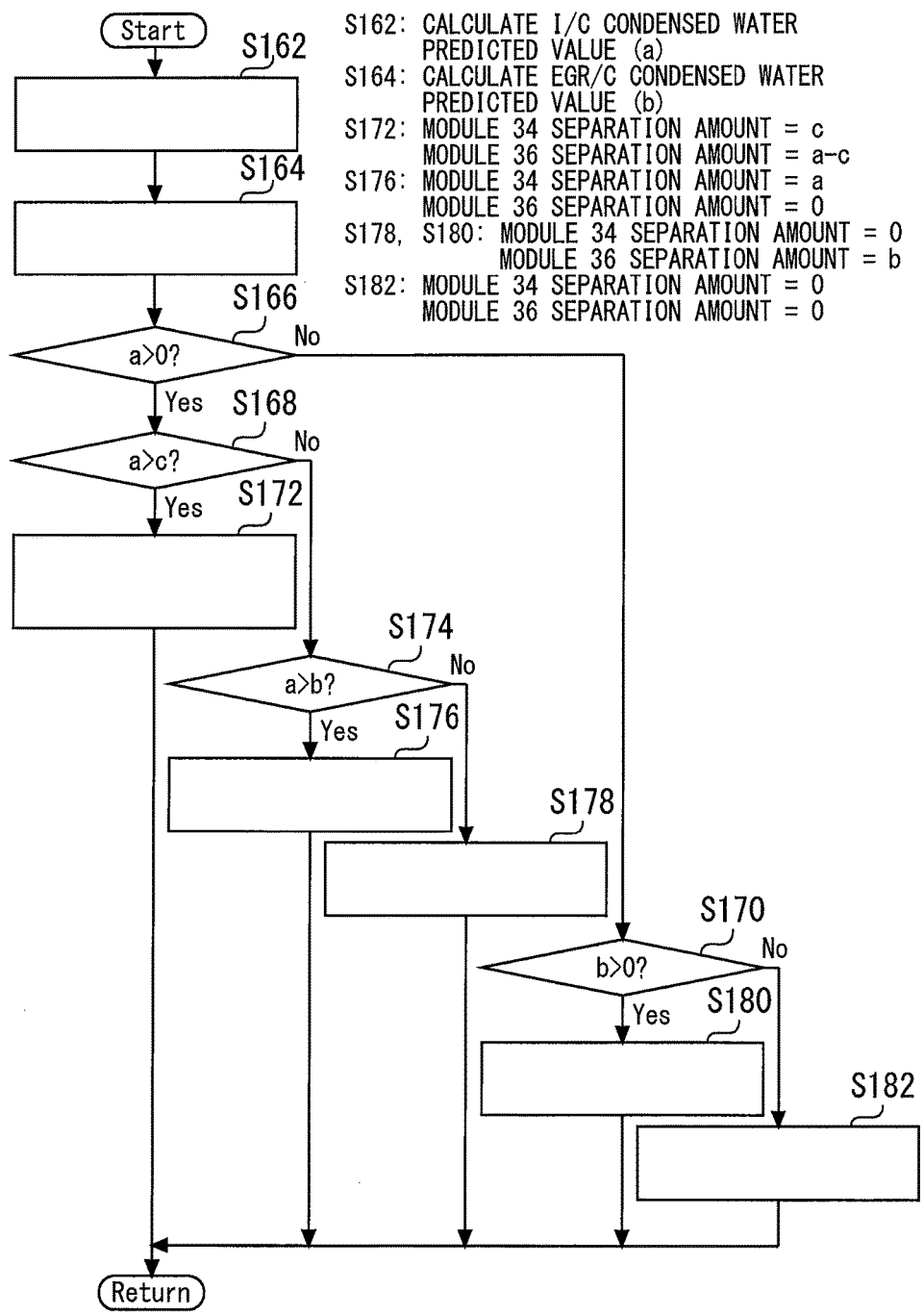
FIG. 17 is a flowchart illustrating an example of processing executed by the ECU 80 in a case of calculating a target separation amount of water vapor at the modules 34 and 36 utilizing a separation limit value c.

In the above described second embodiment, in the routine shown in FIG. 16, the separation limit value d of the module 36 is combined with the predicted values a and b to calculate the target separation amounts of water vapor at the modules 34 and 36. However, the target separation amounts of water vapor at the modules 34 and 36 may be calculated using a separation limit value c of the module 34 instead of the separation limit value d. FIG. 17 is a flowchart illustrating an example of processing executed by the ECU 80 in the case of calculating the target separation amount of water vapor at the modules 34 and 36 using the separation limit value c.

The processing in steps S162 to S166 and steps S170 and S174 to S182 shown in FIG. 17 is the same as the processing in steps S140 to S144 and steps S148 and S152 to S160 shown in FIG. 16. A first difference between the processing in FIG. 16 and the processing in FIG. 17 is that the value compared with the predicted value a in step S168 is the separation limit value c. Specifically, the separation limit value c is set based on the following equation (19).

Separation limit value $c$ [g/s]=permeability coefficient $P_{H2O,air}$ [g/(s·m·kPa)]×film area $A_{air}$ [m²]× maximum differential pressure $\Delta P_{H2Omax,air}$ [kPa] of partial water vapor pressure/film thickness $\delta_{air}$ [m] (19)

Note that, the maximum differential pressure $\Delta P_{H2Omax,air}$ in equation (19) corresponds to a partial water vapor pressure difference that arises between the two spaces that are separated by the tubular film 48 at a time that the gas amount that is sent from the pressure reducing pump 40 is made the maximum amount.

A second difference between the processing in FIG. 16 and the processing in FIG. 17 is that when it is determined in step S168 that the relation a>c holds ("Yes"), the target separation amount of water vapor at the module 34 is set to a value that is equal to the separation limit value c, and the target separation amount of water vapor at the module 36 is set to a value that is equal to a difference between the predicted value a and the separation limit value c.

As described above, the target separation amount of water vapor at the modules 34 and 36 can also be calculated by combining the separation limit value c of the module 36 with the predicted values a and b, instead of the separation limit value d. According to the routine shown in FIG. 16, an insufficient amount at the module 34 can be compensated for while removing the maximum amount of moisture at the module 36. According to the routine illustrated in FIG. 17, an insufficient amount at the module 36 can be compensated for while removing the maximum amount of moisture at the module 34.

That is, the target separation amounts of water vapor at the modules 34 and 36 can also be calculated by combining the separation limit values c and d. When processing is performed in accordance with the routine shown in FIG. 16 (or FIG. 17), cases arise in which the maximum amount of moisture is removed at the module 36 (or at the module 34) (see step S150 in FIG. 16 or step S172 in FIG. 17). Because water vapor separation is accompanied by driving of the pressure reducing pumps 40 and 44, performing maximum moisture removal at the module 36 (or at the module 34) is not desirable since it is linked to an increase in energy consumption. In this respect, since the configurations of the modules 34 and 36 are identical, it is possible to perform moisture removal in which the sum total of driving energy of the pressure reducing pumps 40 and 44 is minimized, by combining the separation limit values c and d and calculating target, separation amounts so that a predicted value a+b which is obtained by adding the predicted value a calculated in step S140 and the predicted value b calculated in step S142 in FIG. 16 is evenly shared between the modules 34 and 36.

[Example of Calculation of Target Separation Amounts of Water Vapor at Modules in Case where Another Configuration Example of Internal Combustion Engine is Applied]

In a case of applying the valve control described in the foregoing second embodiment to the non-EGR supercharging system mentioned in the above first embodiment, after removing the EGR passage 28, the EGR cooler 32, the module 36, the temperature sensors 91 and 93, and the pressure sensor 92 and the like from the engine configuration illustrated in FIG. 11, it is sufficient to perform processing that is the same as when EGR gas is not introduced into the intake passage 12. Specifically, the target separation amount of water vapor at the module 34 may be calculated by skipping the processing in step S108 in FIG. 14 and performing the processing from steps S100 to S106 and the processing from steps S120 and S122.

In the case of applying the valve control of described in the foregoing second embodiment to the non-supercharging EGR system mentioned in the foregoing first embodiment, the target separation amount of water vapor of the modules may be calculated in accordance with the engine configuration.

Specifically, in the case of an engine configuration equipped with the modules 34 and 36, after removing the turbocharger 18, the intercooler 24, the temperature sensors 88 and 90 and the pressure sensor 89 and the like from the engine configuration illustrated in FIG. 11, in the processing illustrated in FIGS. 14 to 16, it is sufficient to skip the processing relating to cooling at the intercooler 24. Specifically, it is sufficient to skip steps S112, S120 and S122 in FIG. 14 and steps S140, S148 and S158 in FIG. 16, and to perform processing in which the predicted value a is replaced with the predicted value b in the processing of steps S144, S146 and S150 in FIG. 16. Further, after replacing the predicted value a with the predicted value b, if it is determined in step S146 that the relation b<d holds ("No"), it is sufficient to set the target separation amount of water vapor at the module 36 to a value that is equal to the separation limit value d, and to set the target separation amount of water vapor at the module 34 to zero.

In contrast, in the case of an engine configuration equipped with the module 36 only, after removing the turbocharger 18, the intercooler 24, the module 34, the temperature sensors 88 and 90 and the pressure sensor 89 and the like from the engine configuration illustrated in FIG. 11, in the processing illustrated in FIGS. 14 to 16, it is sufficient to skip the processing relating to cooling at the intercooler 24 and the processing relating to calculation of the target separation amount of the module 34. Specifically, it is sufficient to cancel steps S112, S120 and S122 in FIG.

14 and also cancel the processing other than the processing in step S142 in FIG. 16, and when EGR gas is introduced into the intake passage 12 (when the determination in step S108 is "Yes"), to set the predicted value b calculated in step S142 in FIG. 16 as the target separation amount of water vapor at the module 36, and when EGR gas is not introduced into the intake passage 12 (when the determination in step S108 is "No"), to set the target separation amount of water vapor at the module 36 to zero.

What is claimed is:

1. An internal combustion engine, comprising:
a gas passage through which gas flows into a cylinder;
a cooler which is provided in the gas passage and cools the gas that flows into the cylinder;
a water vapor separating module that constitutes one part of the gas passage on an upstream side in a gas flow direction relative to the cooler, and that comprises a water vapor permeable film which separates two spaces which have different partial water vapor pressures, and allows water vapor to permeate from a space in which a partial water vapor pressure is higher toward a space in which a partial water vapor pressure is lower;
a pressure reducing pump connected to the water vapor separating module by a suction passage, the pressure reducing pump reduces a partial water vapor pressure in an outer space so that a difference in partial water vapor pressures arises between an inner space of the water vapor permeable film in which gas that flows into the water vapor separating module from the gas passage flows and the outer space which is separated from the inner space by the water vapor permeable film;
a water vapor condenser which is connected to the pressure reducing pump and condenses water vapor that moves from the inner space to the outer space; and
a water injector which is connected to the water vapor condenser and injects condensed water that arises at the water vapor condenser into the cylinder or an intake port.

2. The internal combustion engine according to claim 1, further comprising an electronic control unit and a valve provided between the water vapor separator module and the pressure reducing pump, the electronic control unit is configured to control the valve adjust a pressure reduction amount of the partial water vapor pressure in the outer space that is reduced by the pressure reducing pump, so that a partial water vapor pressure on a downstream side in the gas flow direction relative to the cooler in the gas passage is less than a saturated water vapor pressure.

3. The internal combustion engine according to claim 2, further comprising a condensed water reservoir tank which is provided between the water vapor condenser and the water injecting injector and accumulates condensed water that arises at the water vapor condenser,
wherein the electronic control unit is configured to calculate a target value of the pressure reduction amount based on a target value of a water vapor amount that is moved from the inner space to the outer space, and, wherein when a target value of a water amount that is injected into the cylinder or the intake port by the water injector is greater than a target value of the water vapor amount, calculates the target value of the pressure reduction amount based on the target value of the water amount.

4. The internal combustion engine according to claim 1,
wherein the gas passage is an EGR passage which connects an intake passage and an exhaust passage;
the cooler is an EGR cooler that cools EGR gas which flows through the EGR passage; and
the water vapor separating module constitutes one part of the EGR passage on an upstream side in the gas flow direction relative to the EGR cooler of the EGR passage.

5. The internal combustion engine according to claim 1,
wherein the gas passage is an intake passage in which a compressor of a turbocharger is provided;
the cooler is an intercooler that cools gas which is compressed by the compressor; and
the water vapor separating module constitutes one part of the intake passage on an upstream side in the gas flow direction relative to the compressor of the intake passage.

* * * * *

UNITED STATES PATENT AND TRADEMARK OFFICE
CERTIFICATE OF CORRECTION

PATENT NO. : 10,359,012 B2
APPLICATION NO. : 15/591865
DATED : July 23, 2019
INVENTOR(S) : Kazuki Kikuchi It is certified that error appears in the above-identified patent and that said Letters Patent is hereby corrected as shown below:

In the Specification

Column 18, Line 30, delete "$34G_{H2O,I/C}$ [g/s]-$G_{H2Omax,I/C}$ [g/s]" and insert --$34=G_{H2O,I/C}$ [g/s]-$G_{H2Omax,I/C}$ [g/s]--, therefor.

Signed and Sealed this
Seventeenth Day of September, 2019

Andrei Iancu
*Director of the United States Patent and Trademark Office*